United States Patent
Jung et al.

(10) Patent No.: US 11,077,546 B2
(45) Date of Patent: Aug. 3, 2021

(54) ROBOT

(71) Applicant: LG ELECTRONICS INC., Seoul (KR)

(72) Inventors: Chungin Jung, Seoul (KR); Sunho Yang, Seoul (KR); Eulpyo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/723,316

(22) Filed: Dec. 20, 2019

(65) Prior Publication Data

US 2020/0206895 A1 Jul. 2, 2020

(30) Foreign Application Priority Data

Jan. 2, 2019 (WO) ................ PCT/KR2019/000051

(51) Int. Cl.
| | |
|---|---|
| B25J 5/00 | (2006.01) |
| B25J 11/00 | (2006.01) |
| B25J 19/06 | (2006.01) |
| B25J 9/00 | (2006.01) |
| B25J 17/02 | (2006.01) |

(52) U.S. Cl.
CPC ............ *B25J 5/007* (2013.01); *B25J 9/0009* (2013.01); *B25J 11/00* (2013.01); *B25J 19/061* (2013.01); *B25J 17/0241* (2013.01)

(58) Field of Classification Search
CPC ........ B25J 5/007; B25J 19/061; B25J 9/0009; B25J 11/00; B25J 17/0241; G05B 13/027
See application file for complete search history.

(56) References Cited

U.S. PATENT DOCUMENTS

| | | | |
|---|---|---|---|
| 2009/0177323 A1 | 7/2009 | Ziegler et al. | |
| 2010/0185990 A1 | 7/2010 | Ha et al. | |
| 2014/0009561 A1 | 1/2014 | Sutherland et al. | |
| 2015/0012163 A1 | 1/2015 | Crawley | |
| 2017/0255301 A1* | 9/2017 | Norton .................... | G06F 3/011 |
| 2018/0178377 A1 | 6/2018 | Yang et al. | |
| 2020/0406468 A1* | 12/2020 | Stoianovici .............. | B25J 5/007 |

FOREIGN PATENT DOCUMENTS

| | | |
|---|---|---|
| CN | 207930678 | 10/2018 |
| CN | 208276918 | 12/2018 |
| JP | 2006-136963 | 6/2006 |
| KR | 10-0824315 | 4/2008 |
| KR | 10-2009-0128637 | 12/2009 |
| KR | 10-2010-0085297 | 7/2010 |
| KR | 10-1081324 | 11/2011 |
| KR | 10-2017-0056718 | 5/2017 |
| KR | 10-2018-0074499 | 7/2018 |

* cited by examiner

*Primary Examiner* — Karen Masih
(74) *Attorney, Agent, or Firm* — Ked & Associates, LLP

(57) ABSTRACT

A robot includes a main body provided with a traveling unit, a body display unit disposed on an upper portion of a front side of the main body and elongated in a vertical direction, a head display unit rotatably connected to an upper portion of the body display unit, a rotary motor disposed inside the body display unit, a rotational shaft elongated in a vertical direction and rotated by the rotary motor to rotate the head display unit, and a speaker disposed inside the body display unit, spaced apart from the rotary motor, and overlapping the rotational shaft in a horizontal direction. The robot selectively receives various types of service modules to provide different services.

11 Claims, 15 Drawing Sheets

ROBOT

CROSS-REFERENCE TO RELATED APPLICATION(S)

The present application claims priority under 35 U.S.C. 119 and 35 U.S.C. 365 to International Patent Application No. PCT/KR2019/000051, filed on Jan. 2, 2019, which is hereby incorporated by reference in its entirety.

BACKGROUND

1. Field

The present disclosure relates to a robot that is capable of autonomous driving, and more specifically, a robot having a rotating head display.

2. Background

Robots have been developed for various uses, such as to perform tasks related to factory automation, medical treatments, and exploration of space and undersea. The applications for robots are being further expanded to include tasks in daily life, such as to perform various services related to shopping, cleaning, etc. in response to a user's commands. However, robots are generally designed to provide specific preset services, and the robots cannot be easily adapted to provide different types of services.

BRIEF DESCRIPTION OF THE DRAWINGS

Embodiments will be described in detail with reference to the following drawings in which like reference numerals refer to like elements, and wherein.

DETAILED DESCRIPTION

Hereinafter, specific embodiments of a robot (also referred to as a modular movable robot) 1 will be described in detail with reference to the accompanying drawings.

Figure 1:
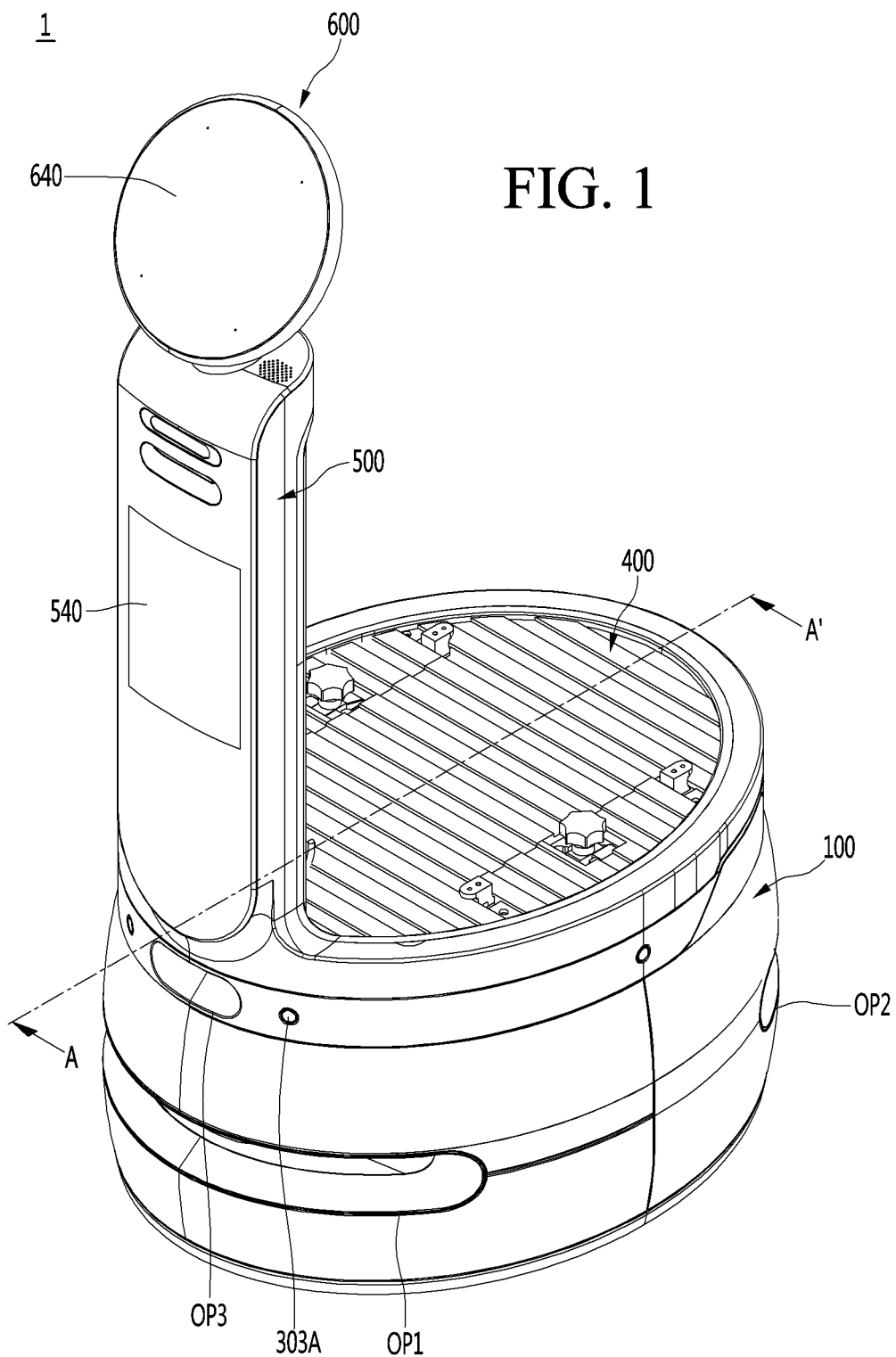
FIG. 1 is a perspective view of a robot according to an embodiment.
Figure 2:
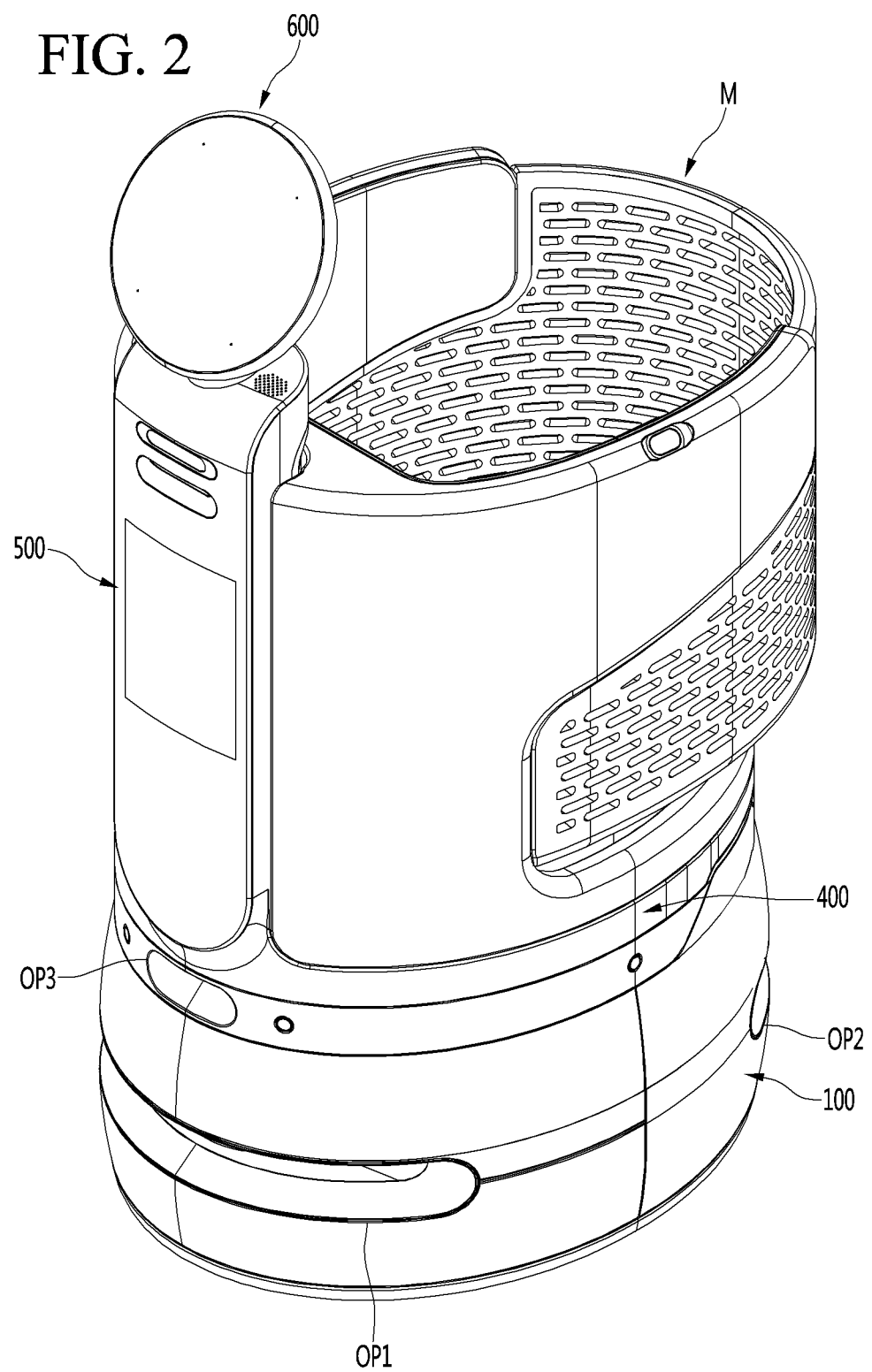
FIG. 2 is a perspective view of the robot of FIG. 1 on which a service module is mounted, according to an embodiment.
Figure 3:
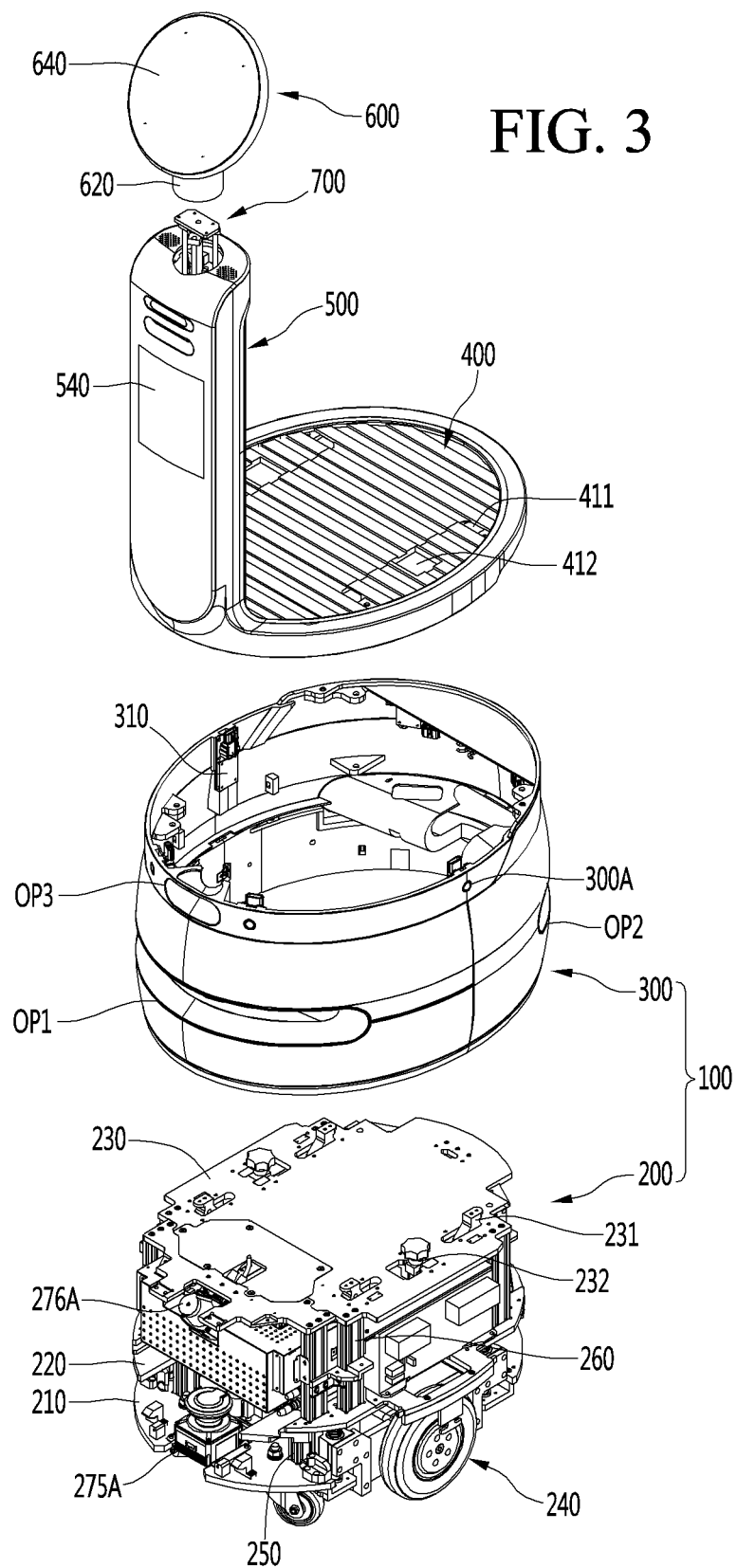
FIG. 3 is an exploded perspective view of the robot of FIG. 1 according to an embodiment.

FIG. 1 is a perspective view of the robot 1, FIG. 2 is a perspective view of the robot 1 on which a service module M is mounted, and FIG. 3 is an exploded perspective view of the robot 1 according to an embodiment. The robot 1 according to an embodiment may include a main body 100, a traveling unit 240, a module supporting plate 400, display units 500 and 600, and a rotation mechanism 700.

The main body 100 may be associated with a primary structure of the robot 1. The length of the main body 100 in a first horizontal (e.g., front-rear) direction may be longer than the width of the main body 100 in a second horizontal (e.g., left-right) direction that crosses the first horizontal direction. For example, a cross-section of the main body 100 in a substantially horizontal plane (e.g., a plane parallel to a surface on which the robot 1 is travelling) may have a substantially elliptical shape. In another example, a cross-section of the main body 100 in a horizontal plane may have a substantially ovoid (e.g., egg-like) shape The main body 100 may include an inner module 200 and a housing (also referred to as a first housing or lower housing) 300 surrounding the inner module 200. The inner module 200 may be disposed inside the housing 300. The traveling unit 240 may be provided below the inner module 200.

The inner module 200 may include a plurality of plates and a plurality of frames. For example, the inner module 200 may include a lower plate (or first plate) 210, an upper plate (also referred to as a second, intermediate, or support plate) 220 disposed on the upper side of the lower plate 210, and a top plate (or third plate) 230 disposed on the upper side of the upper plate 220. In addition, the inner module 200 may further include a plurality of lower supporting frames (or lower support posts) 250 and a plurality of upper supporting frames (or upper support posts) 260.

The lower plate 210 may form the bottom surface of the main body 100. The lower plate 210 may be referred to as a base plate. The lower plate 210 may be substantially flat. The lower plate 210 may be coupled to or receive the traveling unit 240.

The upper plate 220 may be spaced above the lower plate 210. The upper plate 220 may be referred to as a middle plate. The upper plate 220 may be substantially flat. The upper plate 220 may be disposed between the lower plate 210 and the top plate 230 in a vertical direction.

The lower supporting frame 250 may be disposed between the lower plate 210 and the upper plate 220. The lower supporting frame 250 may be elongated in the vertical direction. The lower supporting frame 250 may support the upper plate 220 at its lower side.

The top plate 230 may form the top surface of the main body 100. The top plate 230 may be spaced above the upper plate 220. For example, the upper supporting frame 260 may be disposed between the upper plate 220 and the top plate 230. The upper supporting frame 260 may be elongated in the vertical direction. The upper supporting frame 260 may support the top plate 230 at its lower side.

The housing 300 may form the outer circumferential surface of the main body 100. A space in which the inner module 200 is disposed may be formed in the housing 300. The top surface and the bottom surface of the housing 300 may be opened.

The housing 300 may surround the edges of the lower plate 210, the upper plate 220, and the top plate 230. In this example, the inner circumference of the housing 300 may contact the side edges of each of the lower plate 210, the upper plate 220, and the top plate 230, but is not limited thereto.

A front opening OP1 may be formed in the front portion of the housing 300. The front opening OP1 may be opened toward the front side of the robot 1. A front light detection and ranging (lidar) sensor 275A or other type of sensor may detect an obstacle or the like positioned in front of the robot 1 through the front opening OP1, or collect data to form a map of the region in front of the robot 1.

A rear opening OP2 may be formed in the rear portion of the housing 300. The rear opening OP2 may be opened toward the rear side of the robot 1. The rear opening OP2 may be elongated along the circumferential direction of the housing 300. A rear lidar sensor 275B (see FIG. 4) or other type of sensor may detect an obstacle or the like positioned behind the robot 1 through the rear opening OP2, or may map the rear region of the robot 1. In addition, a backcliff sensor 276B (see FIG. 4) may detect a cliff, drop-off, or other hazard behind the robot 1 via the rear opening OP2.

An upper opening OP3 may be formed in the front side of the housing 300. The upper opening may be formed above the front opening OP1. The upper opening OP3 may be opened toward the front side or the front lower side. The cliff sensor 276A may detect a cliff, drop-off, or other type of hazard in front of the robot 1 through the upper opening OP3.

The housing 300 may have a plurality of openings 303A. For example, the openings 303A may be formed on an upper portion of the housing 300. The plurality of openings 303A may be spaced apart from each other along the circumferential direction of the housing 300. Ultrasonic sensor 310 or other type of object sensors may detect an object around the robot 1 via the openings 303A.

The housing 300 may include a material having a first thermal conductivity, and the inner module 200 may include a material having a second thermal conductivity higher than the first thermal conductivity. In more detail, at least one of the lower plate 210, the upper plate 220, the top plate 230, the lower supporting frame 250, or the upper supporting frame 260 may include a material having a second thermal conductivity higher than the first thermal conductivity. For example, the housing 300 may include an injection plastic material, and at least one of the lower plate 210, the upper plate 220, the top plate 230, the lower supporting frame 250, or the upper supporting frame 260 may include a metal material such as aluminum.

Therefore, heat generating components disposed in the inner module 200 may be smoothly dissipated by conduction via the higher thermal conductivity material. At the same time, it is possible to prevent the housing 300, which forms the appearance of the main body 100, from becoming hot (e.g., to be heated above a threshold temperature) due to the low thermal conductivity material.

The traveling unit 240 may drive a movement of the robot 1. The traveling unit 240 may be provided at the lower portion of the main body 100. For example, the traveling unit 240 may be provided on the lower plate 210. The detailed configuration of the traveling unit 240 will be described later in detail.

The module supporting plate 400 may be mounted on the top surface of the main body 100. The module supporting plate 400 is preferably a horizontal plate-shaped member, but is not limited thereto. Like the main body 100, the module supporting plate 400 may have a longitudinal length in a first horizontal direction that is longer than the horizontal width of the module supporting plate 400 in a second horizontal direction. For example, the module supporting plate 400 may support a service module M from the lower side. For example, the service module M may be sized and configured to seat and be supported on the module supporting plate 400.

The service module M may be detachably mounted on the module supporting plate 400.

In connection with the service module M, the robot 1 of the present disclosure may be referred to as a "mobile module carrying robot", and the entire structure including the mobile module 1 and the service module M may be referred to as a "robot". However, in order to avoid confusion in the description, these names are not used below.

The service module M may be an object to be carried by the robot 1 and types of the service module M are not limited. Therefore, it should be appreciated that different service modules M may be mounted on the same robot 1 and used to enable different types of services to be performed by robot 1. For example, a user may remove a first type of service module M related to performing one service and install a second type of service module M related to performing a second, different service to the robot 1. For example, the service module M shown in FIG. 4 may be associated with a cart capable of holding goods (e.g., a shopping cart). In this case, the robot 1 equipped with the cart-type service module M may be used in a market, and the user would not have to push the cart directly since the robot 1 may perform travelling within the market.

The top surface of the main body 100, that is, the top plate 230 may include at least one module guide 231 for guiding the installation position of the service module M and at least one module fastening portion 232 for fastening the service module M. The module guide 231 and the module fastening portion 232 may protrude upward from the top plate 230.

The module guide 231 may pass through a sub throughhole 411 formed in the module supporting plate 400, may guide the installation position of the service module M, and may prevent the service module M from shaking or otherwise moving unintentionally in a horizontal direction. The module fastening portion 232 may pass through sub-opening holes 412 formed in the module supporting plate 400 and may be fastened to the service module M. Therefore, the service module M may be firmly mounted on the upper side of the module supporting plate 400. The module guide 231 and/or the module fastening portion 232 may provide a surface to be handled by a user. For example, module guide 231 and/or the module fastening portion 232 be used as grips to carry the robot 1.

One or more display units 500 and 600 may be disposed above a front portion of the main body 100. The display units 500 and 600 may be elongated in the vertical direction. The height HD of the display units 500 and 600 from a top surface of the main body (see FIG. 4) may be greater than the height HB of the main body 100 from a floor or other surface on which the robot 1 travels.

In one configuration, the display units 500 and 600 may include a body display unit (also referred to as a first or lower display module or an upper body) 500 and a head display unit (also referred to as a second or upper display module) 600. The body display unit 500 may be integrally formed with the module supporting plate 400 to form a single unit. In this example, the body display unit 500 may extend upward from the front end of the module supporting plate 400. However, the body display unit 500 and the module supporting plate 400 may be formed as separate members in other examples.

The height of the body display unit 500 may be greater than the height of the main body 100, such that the body display unit 500 may be positioned above the main body 100. The body display unit 500 may include a body display (or first display) 540 provided on the front surface thereof. The body display 540 may operate as an output unit for displaying an image or a video. At the same time, the body display 540 may operate as an input unit including a touch screen and capable of receiving a touch input or detecting a proximity of a user's finger or a pointer device held by the user. In one example, the body display 540 may be omitted, and the body display unit 500 may be referred to as an upper body that positions the head display unit 600 above the main body 100.

The body display unit 500 may be disposed in front of the service module M mounted on the module supporting plate 400. For example, a groove corresponding to the shape of the body display unit 500 may be formed on the front portion of the service module M, and the body display unit 500 may be inserted into the groove. For example, the body display unit 500 may guide the mounting position of the service module M.

The head display unit 600 may be disposed above the body display unit 500. The head display unit 600 may be rotatably connected to the upper portion of the body display unit 500. For example, the head display unit 600 may include a neck housing 620 that is rotatably connected to the body display unit 500. The rotation mechanism 700 to rotate the head display unit 600 may be provided in the inside of the neck housing 620.

The head display unit 600 may include a head display (or second display) 640 provided on the front side. The head display unit 600 may be directed toward the front side or the front upward side. The head display 640 may display an image or a video showing a human facial expression. Therefore, the user may perceive that the head display unit 600 resembles a head of a person.

The head display unit 600 may rotate in a predetermined range (for example, 180 degrees) to the left and right with respect to a vertical rotational shaft (e.g., the rotational mechanism) to mimic a movement of a head of a person. The rotation mechanism 700 may rotate the head display unit 600 with respect to the body display unit 500. The rotation mechanism 700 may include, for example, a rotary motor (not shown) and a rotational shaft rotated by the rotary motor. The rotary motor may be disposed inside the body display unit 500, and the rotational shaft may extend from the inside of the body display unit 500 to the inside of the neck housing 620 and may be connected to the head display unit 600.

Figure 4:
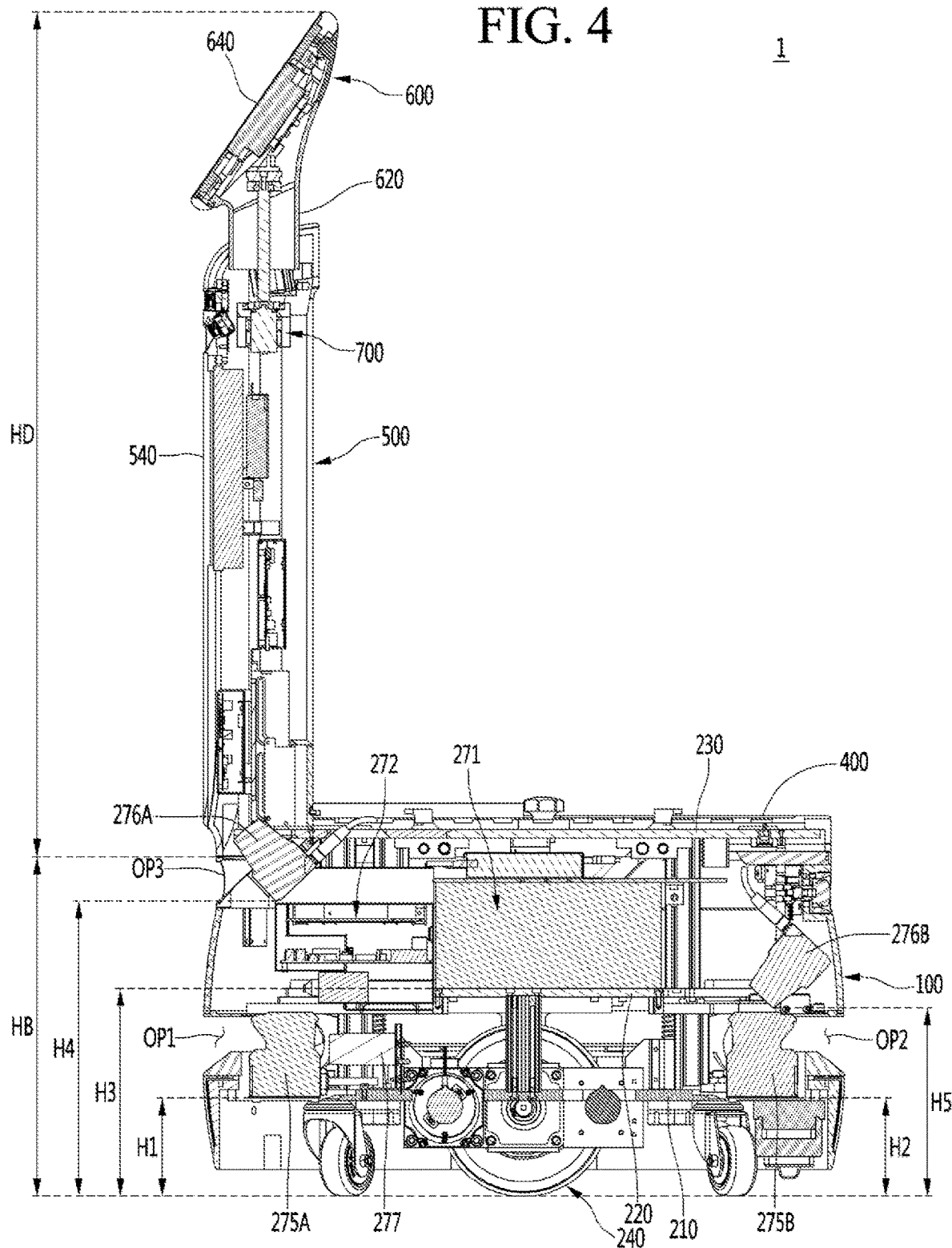
FIG. 4 is a cross-sectional view of the robot of FIG. 1 taken along line A-A'.

FIG. 4 is a cross-sectional view of the modular mobile robot 1 taken along line A-A' of FIG. 1. A battery 271 and a control box 272 may be incorporated in the main body 100. In addition, the main body 100 may include a front lidar (or other front sensor) 275A and a rear lidar (or other rear sensor) 275B.

The battery 271 may store power for operation of the robot 1. The battery 271 may be supported by the upper plate 220 of the inner module 200. The battery 271 may be disposed between the upper plate 220 and the top plate 230. The battery 271 may be eccentrically disposed rearward from the inside of the main body 100. For example, a first distance between a front of the robot 1 and a front surface of the battery 271 may be greater than a second distance between a rear of the robot 1 and a rear surface of the battery 271

In addition, the display units 500 and 600 can be supported by the top plate 230 of the inner module 200. The display units 500 and 600 may be disposed above the front side of the top plate 230. The body display unit 500 may not overlap the battery 271 in the vertical direction. For example, when viewed from above, the body display unit 500 may be positioned at a front region of the main body 100, and the battery 271 may be positioned at a portion of the main body 100 behind the body display unit 500.

With this configuration, the load of the battery 271 and the loads of the body display unit 500 and the head display unit 600 may be balanced. For example, the position of the battery 271 relative to the body display unit 500 and the head display unit 600 and/or other components may help to prevent the robot 1 from being tipped forward or backward or overturning.

A control box (or controller) 272 may be disposed in front of the battery 271. The control box 272 may be supported by the upper plate 220 of the inner module 200. The control box 272 may be disposed between the upper plate 220 and the top plate 230. The control box 272 may be positioned under the display units 500 and/or 600 such that at least part of the control box 272 may be overlapped by the display units 500 and 600 in the vertical direction.

The control box 272 may include a case having a box or other shape and a controller (e.g., a central processing unit or circuit) provided inside the boxing case. A plurality of through-holes may be formed in the boxing case to dissipate heat inside the control box 272. The controller may include a printed circuit body (PCB) or other circuitry and may control the overall operation of the robot 1. For example, the controller may regulate the distribution of power from the battery 271 to various components to selectively activate or deactivate the various components.

Since the control box 272 is disposed in front of the battery 271, the load of the backwardly eccentric battery 271 and the load of the control box 272 may be balanced. Therefore, the positioning of these loads may help to prevent the robot 1 from being tipped forward or backward or overturning.

The front lidar 275A and the rear lidar 275B may be provided on the front and rear portions of the main body 100, respectively. The lidar is a sensor that may detect the distance to an object and may further detect various physical properties of the object by irradiating laser light and analyzing a reflection of the laser light from the object. For example, the front lidar 275A and the rear lidar 275B may detect nearby objects, geographic features, and the like. The controller of the control box 272 may receive information detected by the front lidar 275A and the rear lidar 275B, may perform three-dimensional (3D) mapping based on the information, and may control the traveling unit 240 such that the robot 1 avoids an obstacle.

As described above, the front lidar 275A may detect information about the front region of the robot 1 through the front opening OP1 formed in the front portion of the main body 100. The rear lidar 275B may detect information about the rear region of the robot 1 through the rear opening OP2 formed in the rear portion of the main body 100.

At least part of the front lidar 275A may be disposed below the control box 272. The front lidar 275A and rear lidar 275B may be disposed at the same height in the main body 100. For example, a vertical distance H1 from a travel surface under the main body 100 to the front lidar 275A may be equal to the vertical distance H2 from the travel surface of the main body 100 to the rear lidar 275B.

In addition, the front lidar 275A and the rear lidar 275B may be disposed at a position lower than the battery 271 in the main body 100. The front lidar 275A and the rear lidar 275B can be supported by the lower plate 210 of the inner module 200. For example, the front lidar 275A and rear lidar 275B may be disposed between the lower plate 210 and the upper plate 220.

In one configuration, a vertical distance H3 from the travel surface under the main body 100 to a bottom surface of the battery 271 may be greater than the vertical distance H1 from the travel surface under the main body 100 to a bottom surface of the front lidar 275A. In addition, the vertical distance H3 from the travel surface under the main body 100 to the battery 271 may be greater than the vertical distance H2 from the travel surface under the main body 100 to a bottom surface of the rear lidar 275B. In this configuration, the space in the main body 100 may be used more efficiently as compared with an alternative configuration in which the front lidar 275A and the rear lidar 275B are disposed at a same height as the battery 271. Therefore, the size of the main body 100 may be made compact.

A cliff sensor 276A and a backcliff sensor 276B may be incorporated in the main body 100. The cliff sensor 276A and the backcliff sensor 276B may be suspended from the top plate 230 of the inner module 200. The cliff sensor 276A and the backcliff sensor 276B may be disposed between the upper plate 220 and the top plate 230.

The cliff sensor 276a and the backcliff sensor 276B may monitor a travel surface and may detect the presence or absence of a cliff, depression, or other obstacle on the travel surface by transmitting and receiving infrared (IR) rays. For example, the cliff sensor 276A and the backcliff sensor 276B may scan the travel surface at, respectively, a region in front of and a region behind the robot 1 and detect the presence or absence of cliffs. The controller of the control box 272 may receive information detected by the cliff sensor 276A and backcliff sensor 276B, and may control the traveling unit 240 based on the information such that the robot 1 avoids any detected cliffs.

As described above, the cliff sensor 276A may detect attributes of the travel surface in front of the robot 1 via the upper opening OP3. The backcliff sensor 276B may detect the travel surface behind the robot 1 via the rear opening OP2. In one example, the cliff sensor 276A may be disposed above the front lidar 275A. Similarly, the backcliff sensor 276B may be disposed above the rear lidar 276 6.

At least part of the cliff sensor 276A may be disposed above the control box 272. The backcliff sensor 276B may be disposed behind the battery 271. For example, the cliff sensor 276A may be disposed at a position higher than the backcliff sensor 276B in the main body 100.

For example, a vertical distance H4 from the travel surface under the modular moving robot 1 to a bottom surface of the cliff sensor 276A may be greater than the vertical distance H5 from the travel surface to a bottom surface of the backcliff sensor 276B. Therefore, the space in the main body 100 may be efficiently utilized as compared with the configuration in which the cliff sensor 276A is disposed in front of the control box 272. Therefore, the main body 100 may be made more compact in the front-rear direction.

However, the present disclosure is not limited thereto and at least one of the cliff sensor 276A or the backcliff sensor 276B may be replaced by another type of sensor. For example, robot 1 may include ultrasonic or lidar sensor to monitor for cliffs in the travel surface.

In one configuration, the main body 100 may have a wiring cut-off switch 277 incorporated therein. The wiring cut-off switch 277 may turn off the power of the robot 1 and immediately stop the driving of the robot 1. The wiring cut-off switch 277 may be disposed behind the front lidar 275A. The wiring cut-off switch 277 may be supported by the lower plate 210 of the inner module 200.

Figure 5:
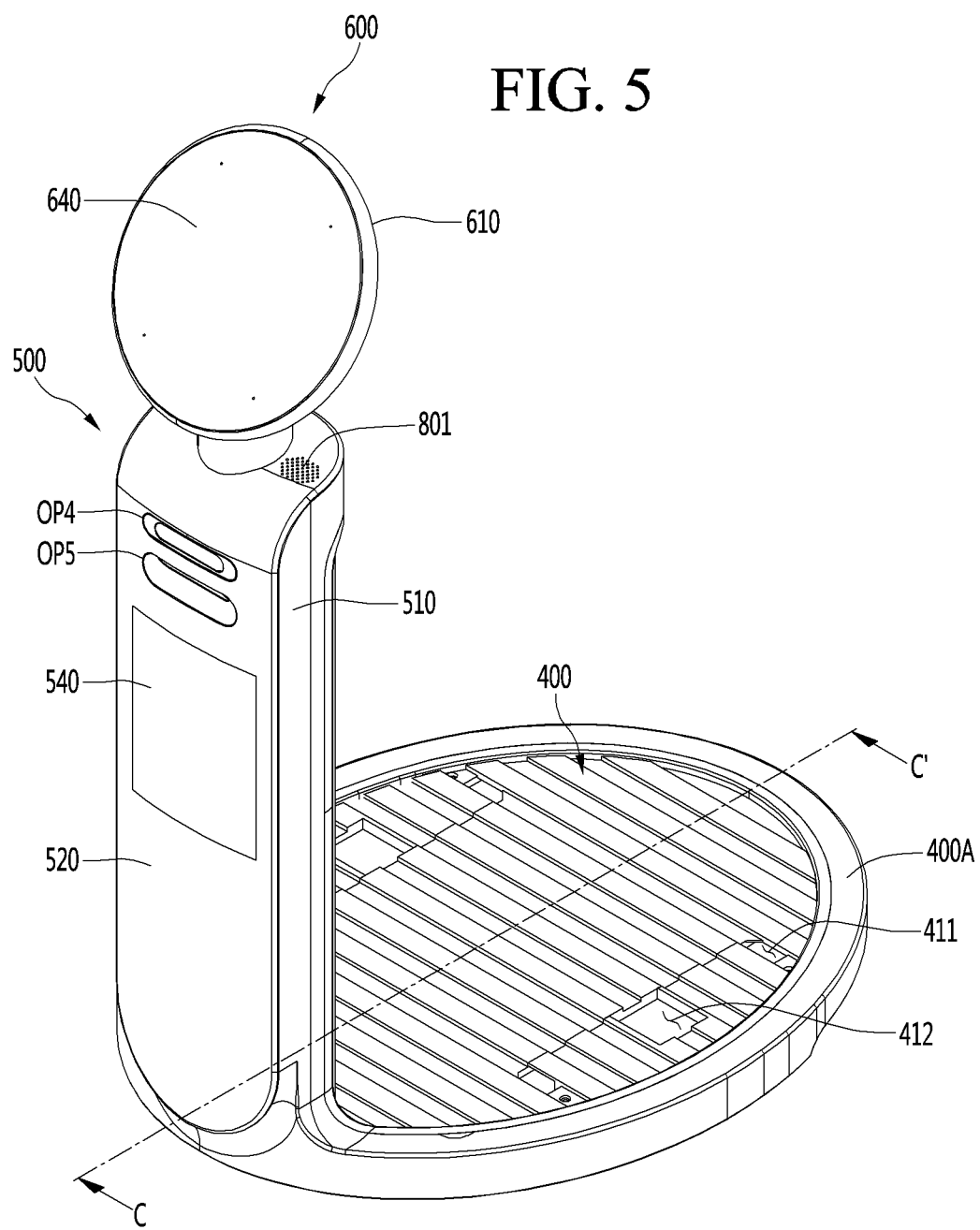
FIG. 5 is a perspective view of a display unit and a module supporting plate included in the robot of FIG. 1 according to an embodiment.
Figure 6:
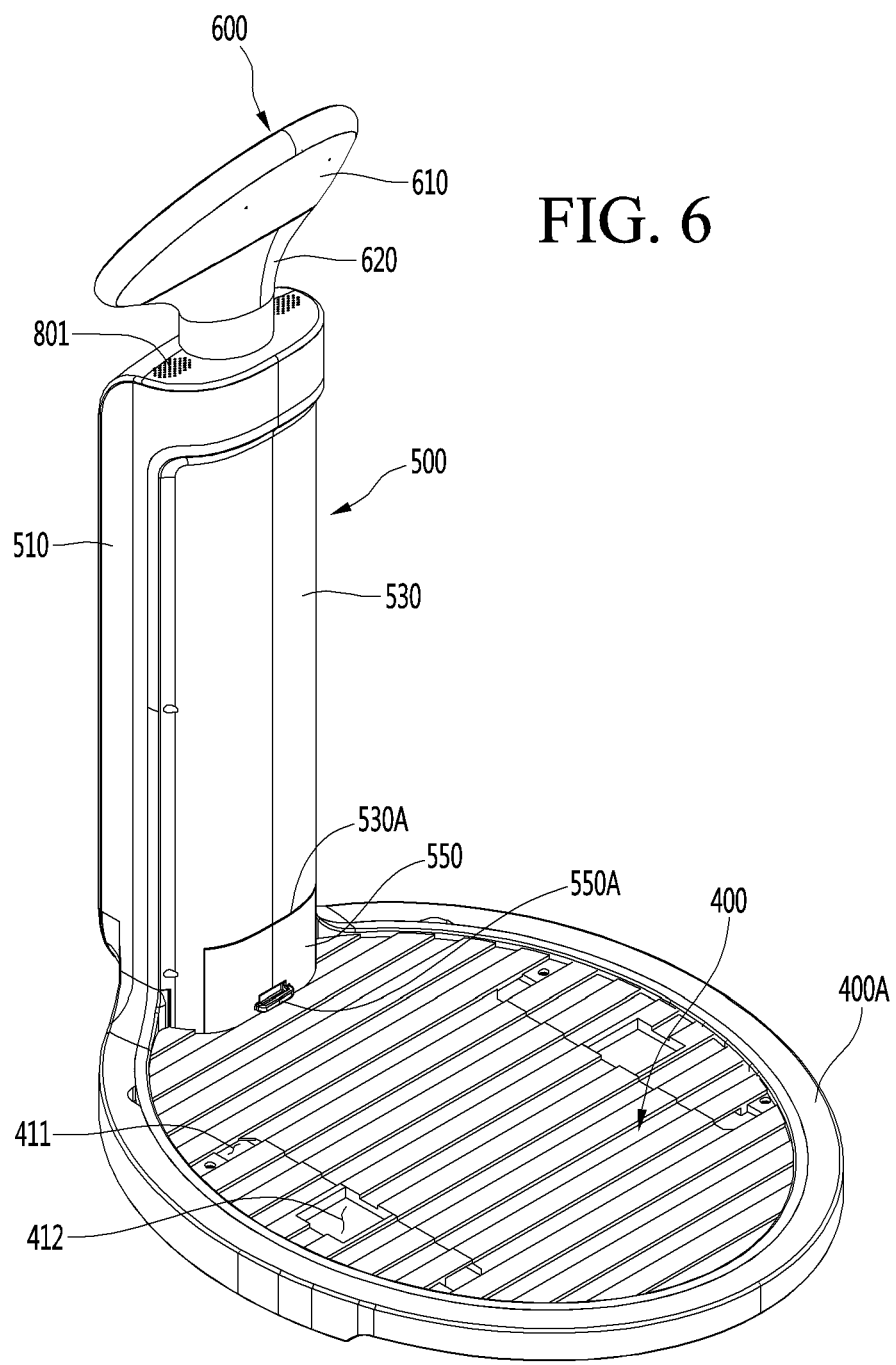
FIG. 6 is a perspective view of the display unit and the module supporting plate of FIG. 5 according to the embodiment, when viewed from another direction.
Figure 7:
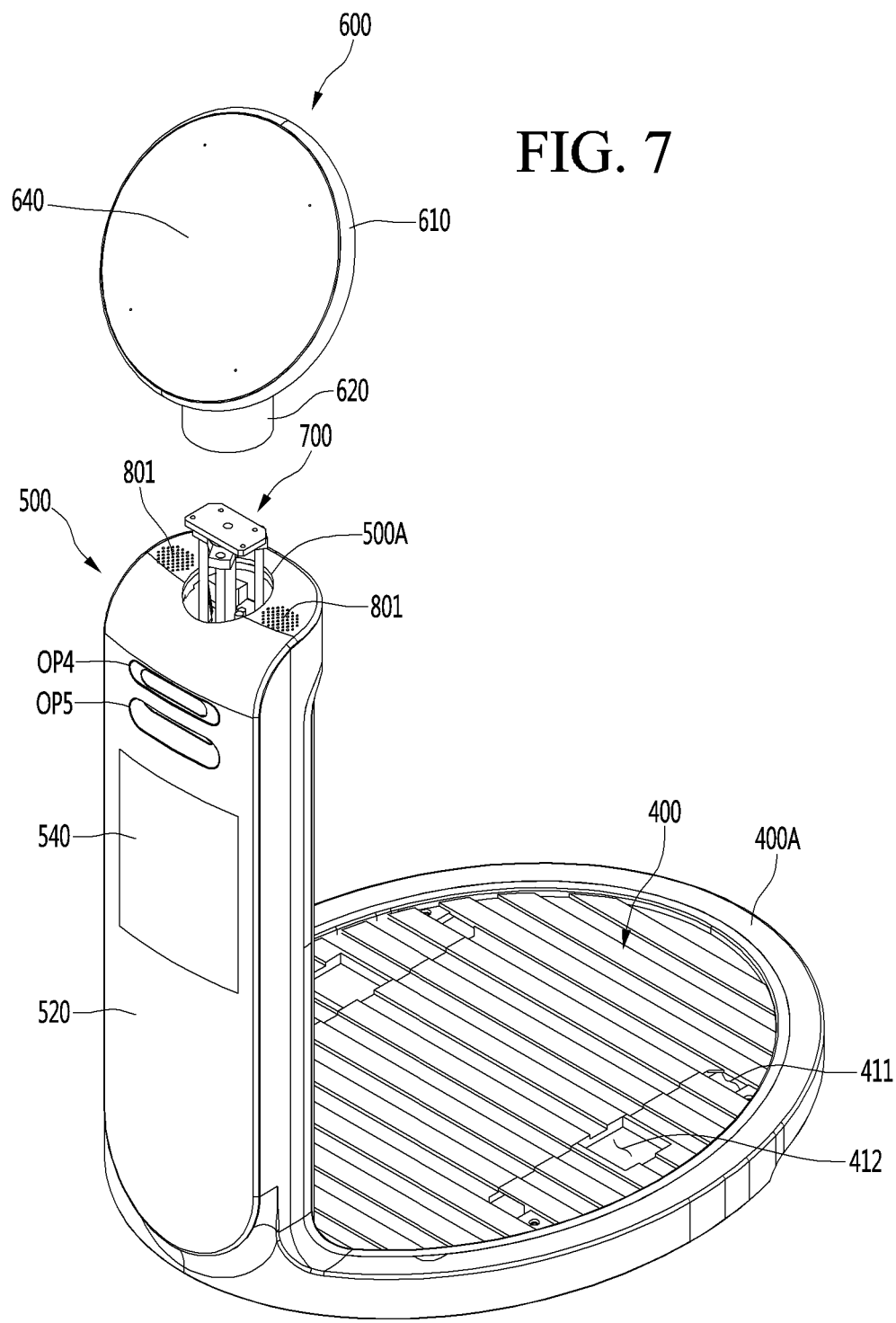
FIG. 7 is a view illustrating a body display unit and a head display unit included in the robot of FIG. 1 and separated from each other, according to an embodiment.
Figure 8:
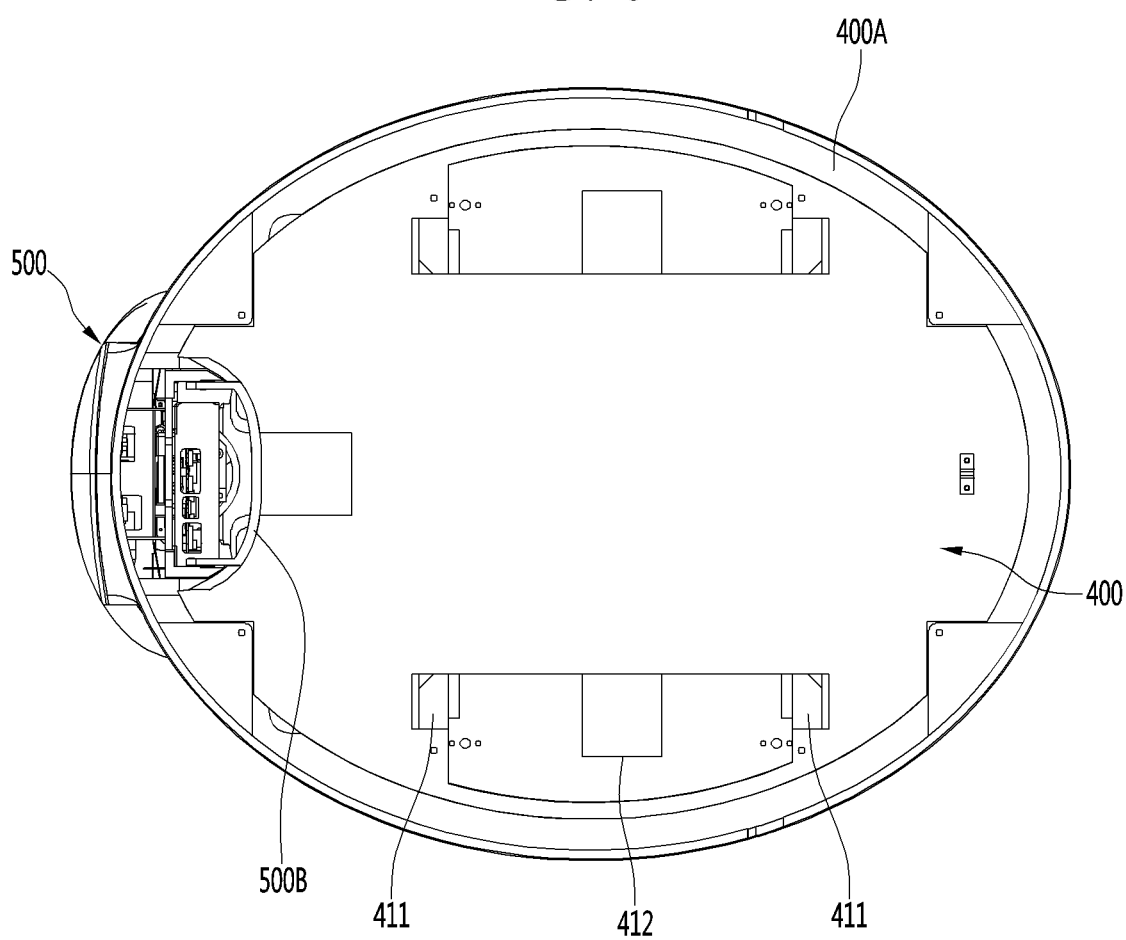
FIG. 8 is a bottom view of the display unit and the module supporting plate of FIG. 5 according to an embodiment.

FIG. 5 is a perspective view of a display unit 500, 600 and a module supporting plate 400 according to an embodiment, FIG. 6 is a perspective view of the display unit 500, 600 and the module supporting plate 400 when viewed from a rear side direction, FIG. 7 is a view illustrating a body display unit 500 and a head display unit 600 separated from each other, according to an embodiment, and FIG. 8 is a bottom view of the display unit 500, 600 and the module supporting plate 400 according to an embodiment. As described above, the display units 500 and 600 may include a vertically elongated body display unit (or body display module) 500 and a head display unit (or head display module) 600 that is rotatably connected to the upper portion of the body display unit 500.

A first cover opening OP4 and a second cover opening OP5 may be formed on the front surface of the body display unit 500. The first cover opening OP4 may be opened toward a front of the modular moving robot 1. A depth camera 851 (see FIG. 11) or other type of sensor may detect the distance between the modular moving robot 1 and a person located in front of the robot 1 and/or an obstacle through the first cover opening OP4. In addition, the depth camera 851 may perform capture an image of person that may be used in a face recognition camera function to recognize a face of a person located in front of the robot 1.

The second cover opening OP5 may be formed below the first cover opening OP4. The second cover opening OP5 may be opened toward the front lower side. An upper cliff sensor 852 (see FIG. 11) or other sensor may detect obstacles on a travel surface in front of the robot 1 through the second cover opening OP5. In this elevated location, the upper cliff sensor 852 may detect a portion of the travel state disposed in front of the robot 1 in a wider range than that of the cliff sensor 276A described above since the upper cliff sensor 852 is positioned relatively higher than the cliff sensor 276A. At the same time, the cliff sensor 276A may detect attributes of the travel state in front of the robot 1 in more detail than the upper cliff sensor 852 since the cliff sensor 276A is positioned relatively closer to the travel surface.

The body display unit 500 may have an acoustic hole 801 formed therein. Sound generated by a speaker 800 (see FIG. 13) disposed inside the body display unit 500 may be emitted to the outside of the robot 1 through the acoustic hole 801.

The acoustic hole 801 may be formed on the top surface of the body display unit 500. The acoustic hole 801 may be formed, for example, on at least one of a left side or a right side of a neck insertion opening 500A into which the neck housing 620 of the head display unit 600 is inserted. Therefore, the body display unit 500 may be made compact in a horizontal (e.g., front-rear) direction as compared with the case where the acoustic hole 801 is formed in front of or behind the neck insertion opening 500A.

The neck insertion opening 500A may be formed on the upper portion or surface of a housing of the body display unit 500. The neck insertion opening 500A may be formed by vertically penetrating the top surface of the body display unit 500. A neck housing 620 of the head display unit 600 may be inserted into the neck insertion opening 500A. In addition, the upper portion of a rotation mechanism 700 (see FIG. 7) may protrude upward from the neck insertion opening 500 and may extend inside of a neck housing 620 provided in a lower region of the head display unit 600.

A lower opening 500B (see FIG. 8) may be formed in the lower portion of the body display unit 500. The lower opening 500B may be formed by as an in opening in a bottom surface of the body display unit 500. The wire or harness connected to the main body 100 may be connected to the inside of the body display unit 500 through the lower opening 500B. In addition, a supporter (or support post) 810 (see FIG. 12) disposed vertically inside the body display unit 500 may be coupled to the main body 100 through the lower opening 500B.

A rear opening 530A may be formed on the back surface of the body display unit 500. For example, the rear opening 530A may be formed on the lower back surface of the body display unit 500 near the module supporting plate 400. The wire or harness connected to the service module M (see FIG. 2) may be connected to the inside of the body display unit 500 through the rear opening 530A. The rear opening 530A may be opened and closed by a door 550.

The door 550 may be provided with a handle (or latch) 550A. The handle 550A may be formed to protrude rearward from the lower back surface of the door 550. The operator may hold the handle 550A, push the door 550 upward to open, and connect the wire or harness connected to the service module M to the inside of the rear opening 530A to electrically couple the service module M to the mobile moving robot 1 so that the service module M may receive power from the battery M and be controlled via the control box 272. Then, the operator may mount the service module M on the upper side of the module supporting plate 400.

Conversely, the operator may separate the service module M from the module supporting plate 400 and may separate the wires or harness connected to the service module M. Then, the operator may hold the handle 550A and push the door 550 downward to close the opening 530A.

The body display unit 500 may include a body housing (or second or intermediate housing) 510, a front cover 520, a rear cover 530, and a body display (or body display panel) 540. The body housing 510 may form the appearance of the body display unit 500. The body housing 510 may define an internal space in which a plurality of components including the body display 540 may be accommodated. At least part of the back surface of the body housing 510 may be opened, and the rear cover 530 may cover the opened back surface of the body housing 510. Therefore, the operator may open the rear cover 530 and easily access the internal space.

A plate mounting portion (or plate mounting frame) 400A on which the module supporting plate 400 is mounted may be connected to the body display unit 500. For example, the body housing 510 may be integrally formed with the plate mounting portion 400A. However, embodiments of the modular mobile robot 1 are not limited thereto. The module support mounting portion 400A may have an annular shape corresponding to the shape of the module supporting plate 400. The body housing 510 may extend upward from a front end of the plate mounting portion 400A.

The front cover 520 may cover the body housing 510 and the body display 540 from the front side. For example, the front cover 520 may cover the front surface and the top surface of the body housing 510. In one configuration, a portion of the front cover 520 may include a transparent material positioned over the body display 540. This transparent portion of the front cover 520 may function as a window of the body display 540.

The first cover opening OP4 and the second cover opening OP5 may be formed on the front surface of the front cover 520. The acoustic hole 801 may be formed on the top surface of the front cover 520.

The rear cover 530 may cover the opened back surface of the body housing 510. As previously described, the rear opening 530A that is opened and closed by the door 550 may be formed at the lower portion of the rear cover 530. In addition, the lower portion of the rear cover 530 may form a lower opening 500B together with the lower portion of the body housing 510.

The body display 540 may display visual content, such as an image or a video, toward a front side of the modular mobile robot. As used herein, "front" may refer to a horizontal direction associated with the output of the body display 540, and "rear" may refer to an opposite horizontal direction. As previously described, the body display 540 may be protected by a portion of the front cover 520. In addition, the body display 540 may operate as an input unit and may include a touch screen or other component configured of detecting a touch input or detecting a proximity of a touch device or user.

In certain configurations, the head display unit 600 may be rotatably connected to the upper portion of the body display unit 500. For example, the head display unit 600 may include a head housing 610, a neck housing 620, and a head display 640.

The head housing 610 may form an outer appearance of the head display unit 600. The head housing 610 may have a substantially disk shape to mimic a shape of a human face, but is not limited thereto. The head housing 610 may be spaced above the body display unit 500.

The head housing 610 may include a front surface facing a front side and a rear surface facing the rear side of the modular moving robot 1. Furthermore, the head housing 610 may be inclined upward to the rear so that the front surface is angled to face upwards, and the rear surface is angled to face downward. The front surface of the head housing 610 may include a flat surface and may be covered by a cover including a glass or other transparent material. The back surface of the head housing 610 may include a curved surface that is continuous with the outer surface of the neck housing 620.

The head housing 610 may be rotated together with the neck housing 620. The neck housing 620 may also be referred to as a neck. The neck housing 620 may have a substantially vertical hollow cylindrical shape. For example, a hollow cavity 620A through which the rotation mechanism 700 passes may be formed inside the neck housing 620.

The neck housing 620 may be inserted into the neck insertion opening 500A formed in the upper portion of the body display unit 500 and rotatably connected thereto. The upper end of the neck housing 620 may be connected to the back surface of the head housing 610. Since the back surface of the head housing 610 may be inclined to face a rear lower direction, the upper end of the neck housing 620 may be inclined in a direction such that a height of the neck housing 620 increases in a rear direction to be mated to the rear surface of the head housing 610.

The neck housing 620 may be formed to be smaller than the head housing 610. Due to the relatively larger herd region associated with the head housing 610 and the relatively smaller neck housing 620, the robot 1 having an appearance similar to that of a human, and so that a user may feel more comfortable to interact with the modular moving robot 1.

The head display 640 may be provided on the front surface of the head housing 610. The head display 640 may be covered by the glass cover included in the front surface of the head housing 610. The head display 640 may face a front upper direction. The head display 640 may display visual content, such as an image or a video, toward the front upper direction. In addition, the head display 640 may operate as an input unit and may include a touch screen or other component capable of detecting touch input or a proximity of a user or touch device.

The size (e.g., surface area) of the head display 640 may be relatively smaller than the size (e.g., surface area) of the body display 540. For example, the body display 540 may operate as a main display, and the head display 640 may operate as an auxiliary display.

Figure 9:
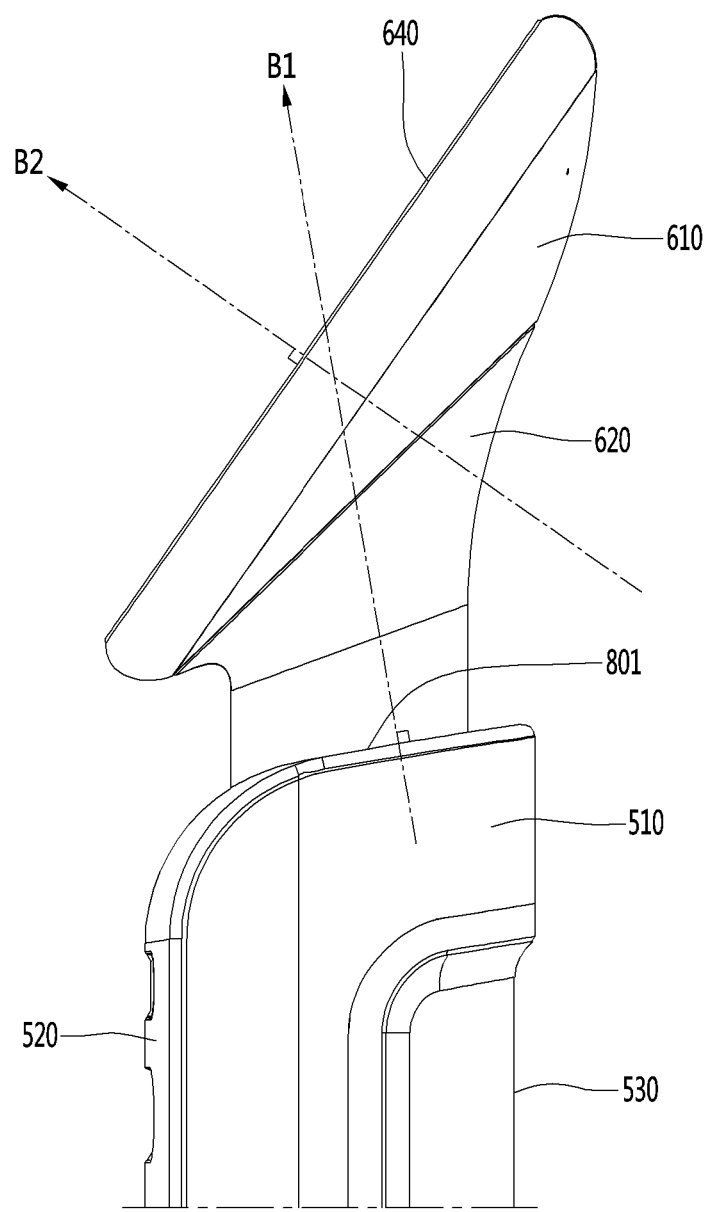
FIG. 9 is an enlarged side view of an upper portion of the display unit of FIG. 5 according to an embodiment.

FIG. 9 is an enlarged side view of the upper portion of the display units 500 and 600 according to an embodiment. The top surface (e.g., shoulder) of the body display unit 500 may face a first direction B1. For example, the acoustic holes 801 formed on the top surface of the body display unit 500 may face the first direction B1. The first direction B1 may be a direction slightly tilted forward from an upwardly vertical direction.

The front surface of the head display unit 600 may face a second direction B2. For example, the head display 640 provided on the angled front surface of the head display unit 600 to face the second direction B2. The second direction B2 may be a direction slightly tilted upward from the horizontal front direction.

The second direction B2 may intersect the first direction B1. For example, the first direction B1 may be relatively close to a vertical direction, and the second direction B2 may be relatively close to a horizontal direction. In one example, the top surface of the body display unit 500, on which the acoustic hole 801 is formed, may be less inclined than the head display 640.

Therefore, the display units 500 and 600 may be configured such that the neck housing 620 has a relatively small length while still positioning the head display unit 600 sufficiently above the body display unit 500 to rotate without interfering with the body display unit 500. For example, if the top surface of the body display unit 500 is formed to be as inclined as the head display 640, the lower end of the head display unit 600 and the rear upper end of the body display unit 500 may interfere with each other while the head display unit 600 is rotating.

In addition, the neck housing 620 may support the head display unit 600 such that the acoustic hole 801 is positioned below the back surface of the head display unit 600. Therefore, water drops falling on the upper side of the robot 1 (e.g., from rain when the modular moving robot is used outdoors) may be blocked by the head display unit 600 and may not flow into the acoustic hole 801.

Figure 10:
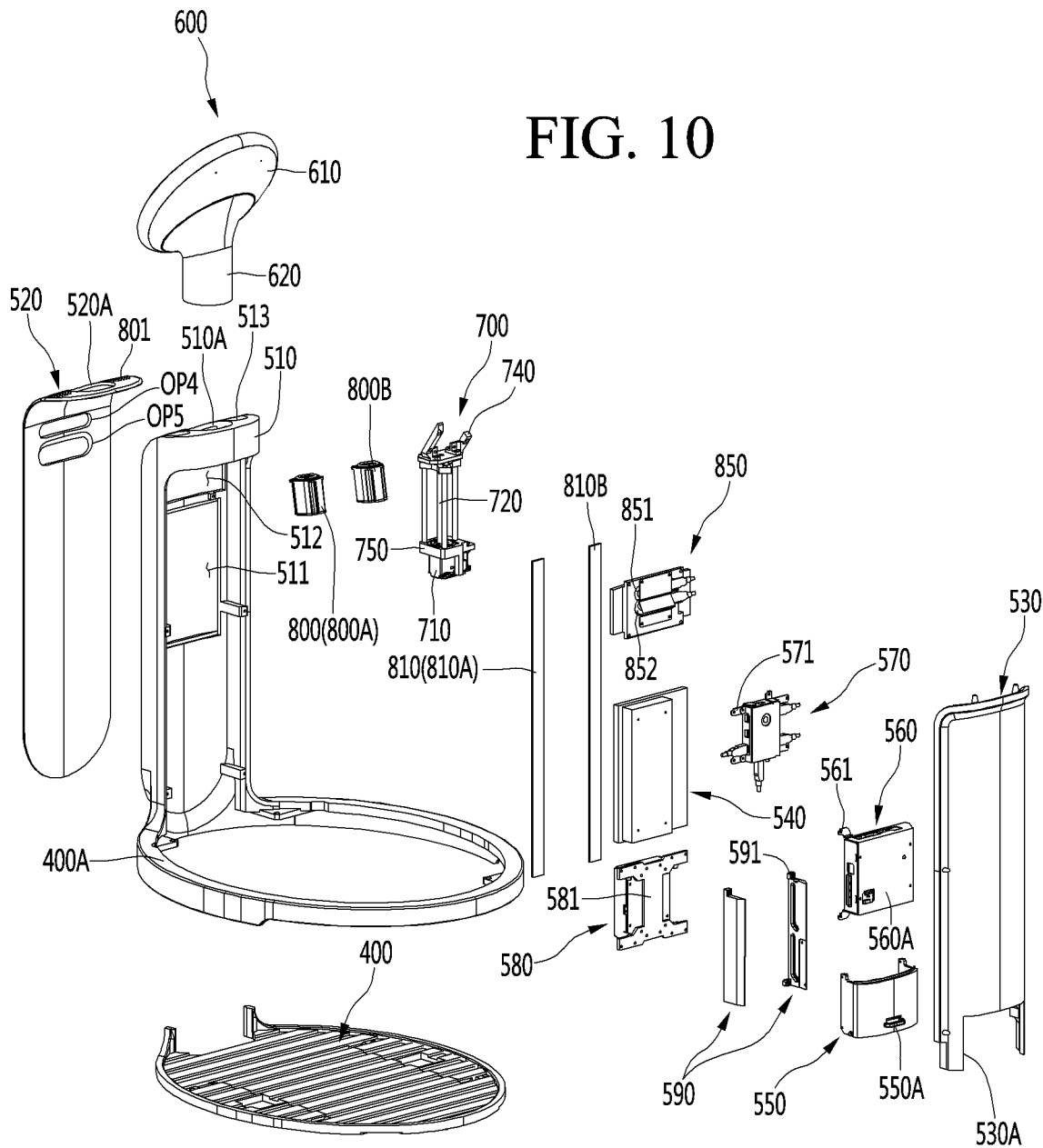
FIG. 10 is an exploded perspective view of the display unit and the module supporting plate of FIG. 5 according to an embodiment.
Figure 11:
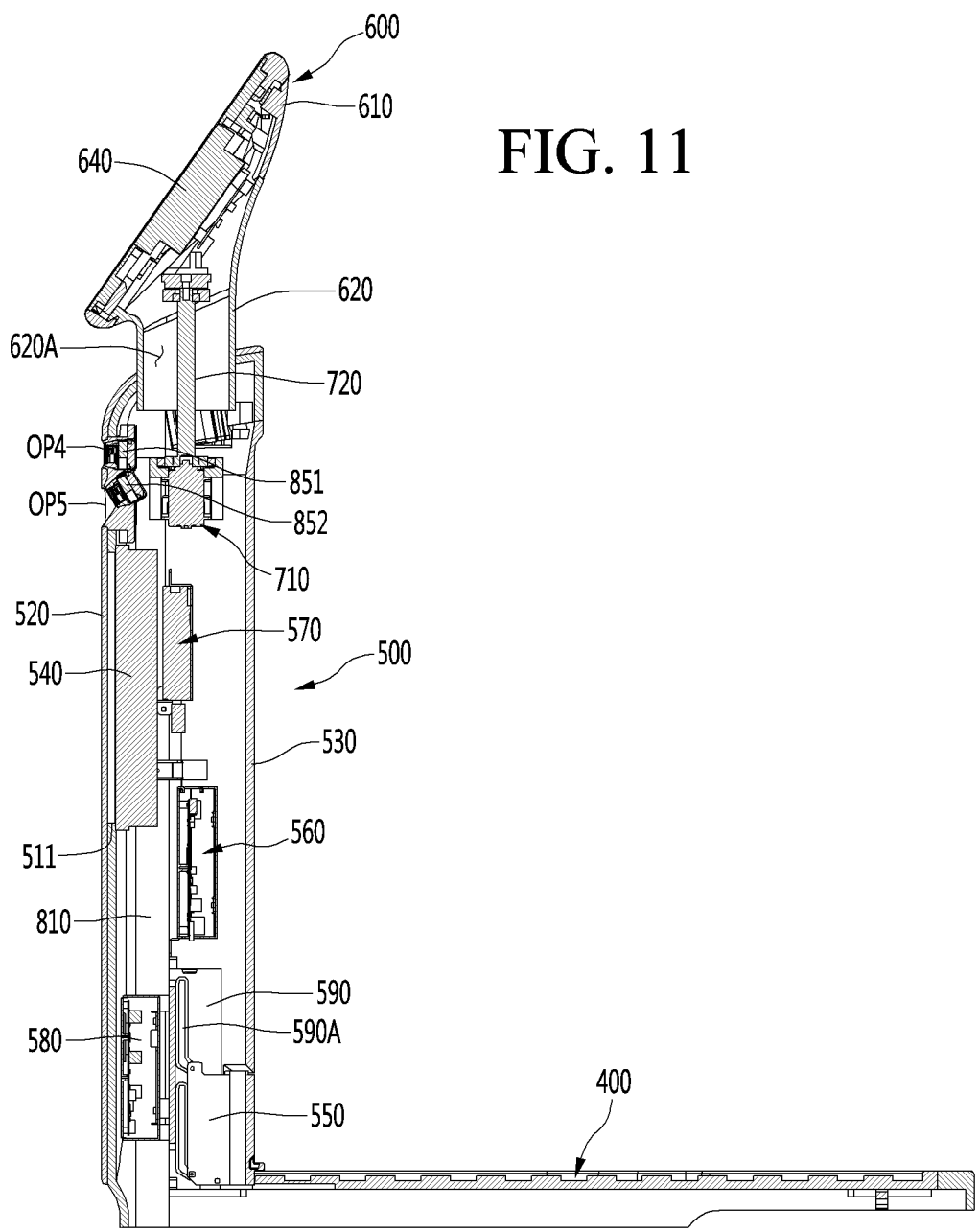
FIG. 11 is a cross-sectional view taken of the display unit and the module supporting plate of FIG. 5 along line C-C'.
Figure 12:
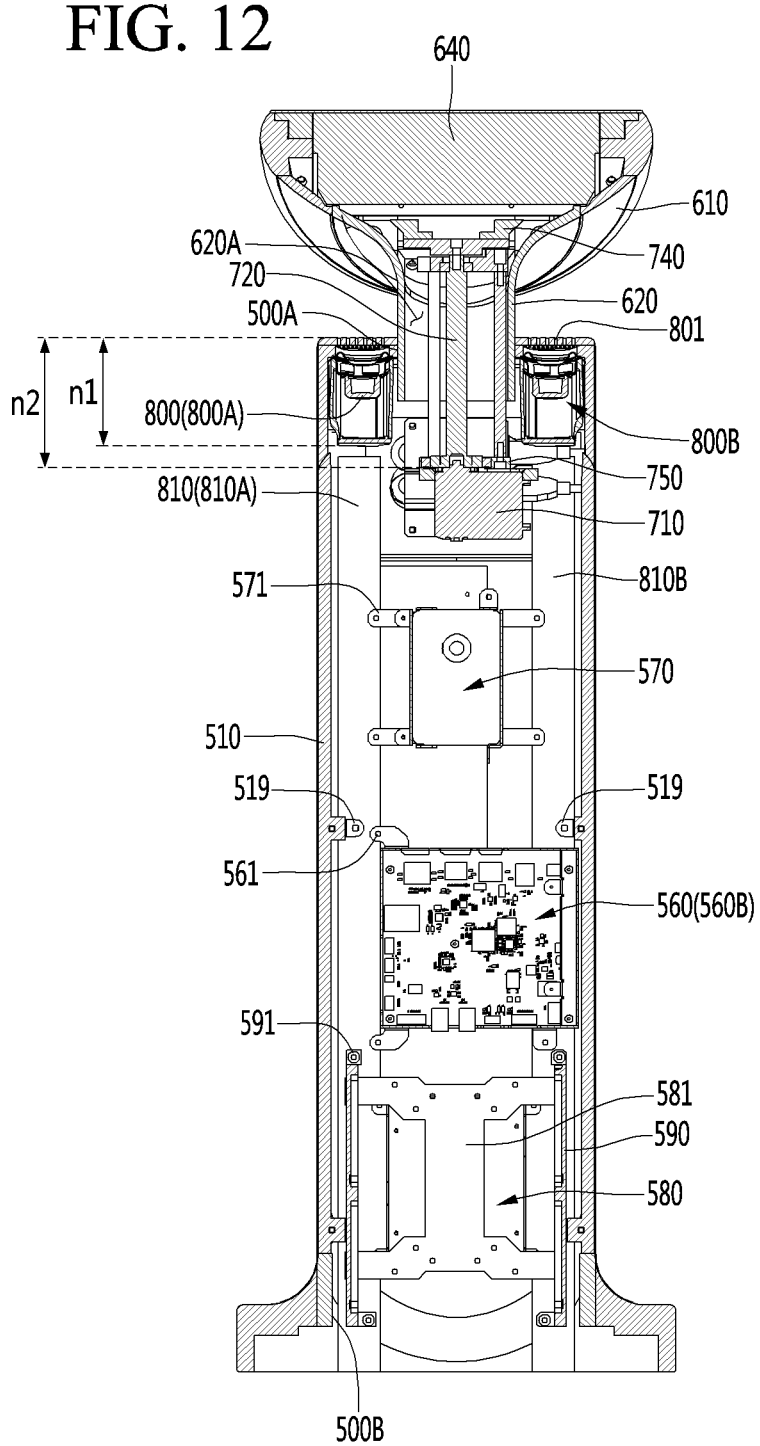
FIG. 12 is a view illustrating the inside of the display unit of FIG. 5 according to an embodiment.

FIG. 10 is an exploded perspective view of the body display unit 500, the head display unit 600, and the module supporting plate 400 according to an embodiment, FIG. 11 is a cross-sectional view of the modular mobile robot 1 taken along line C-C' of FIG. 5, and FIG. 12 is a view illustrating an inside of the body display unit 500 and the head display unit 600 according to an embodiment.

An interface module 560 may be disposed inside the body display unit 500. The interface module 560 may be disposed at a position lower than the body display 540 within the body display unit 500. For example, the vertical distance from the main body 100 to the body display 540 may be greater than the vertical distance from the main body 100 to the interface module 560. The interface module 560 may include a box-shaped module case 560A and an interface controller (or interface circuitry) 560B (see FIG. 12) incorporated in the module case 560A.

At least one fastening bracket 561, fastened to the supporter 810 to be described later, may be formed in the module case 560A. The fastening bracket 561 may be fastened to the supporter 810 at the refar side of the supporter 810. For example, the interface module 560 may be coupled to and supported by the supporter 810.

The interface controller 560B may include an interface printed circuit board (PCB). The interface controller 560B may control a plurality of components included or disposed in the display units 500 and 600. For example, the interface controller 560B may control an image and a video displayed on the body display 540 and the head display 640. In addition, the interface controller 560B may also process commands input through the touch display included in at least one of the body display 540 or the head display 640. In addition, the interface controller 560B may control the rotation mechanism 700. In addition, the interface controller 560B may control an audio unit 580. It should be appreciated that the various components managed by the interface controller 560B is not limited thereto, and the interface controller 560B may manage addition, fewer, or different components.

A hub unit (or hub) 570 may be disposed inside the body display unit 500. The hub unit 570 may mediate the connections between various electronic components included in the robot 1. The hub unit 570 may include a plurality of slots, and a connection terminal of a wire or a harness may be connected to one or more of the slots.

For example, the control box 272 (see FIG. 4) and the interface module 560 may each be connected to the hub unit 570 by a wire or a harness. In addition, one or more of the body display 540, the head display 640, the rotary motor 710, the depth camera 851, the upper cliff sensor 852, the audio unit 580, or the speaker 800 may be connected to the hub unit 570. This configuration may facilitate the electrical connections between the electronic components and may simplify the arrangement of the wire or harness in the body display unit 500.

The hub unit 570 may be disposed behind the body display 540 and may be positioned above the interface module 560. The hub unit 570 may be coupled to and supported by the supporter 810. For example, at least one fastening bracket 571 configured to be fastened to the supporter 810 may be formed in the hub unit 570. The fastening bracket 571 may be fastened to the supporter 810 at the rear side of the supporter 810.

The audio unit (or audio processor) 580 may be disposed inside the body display unit 500. The audio unit 580 may be electrically connected to the speaker 800 to emit sound via the speaker 800. For example, the audio unit 580 may forward an audio signal to the speaker 800, and received the audio signal may cause a movement of a component of the speaker 800 that generates outputted audio content, such as a voice or music. The audio unit 580 may be disposed below the body display 540 and may be disposed in front of the door guide 590 to be described later.

The audio unit 580 may be coupled to and supported by the supporter 810. For example, the audio unit 580 may be provided with an audio bracket 581 fastened to the supporter 810. The audio bracket 581 may be fastened to the supporter 810 in front of the supporter 810.

The door 550 may be connected to the rear cover 530. For example, the door 550 may be raised to open the rear opening 530A, or may be lowered to close the rear opening portion 530B. In one configuration, one or more door guides 590 for guiding the opening and closing operation of the door 550 may be disposed inside the body display unit 500. The door guide 590 may be disposed inside the lower portion of the body display unit 500. The door guide 590 may be disposed behind the audio unit 580.

The door guide 590 may be elongated in the vertical direction. The door guide 590 may be provided with a pair of door guides spaced apart from each other in left and right. One of the door guides 590 may guide the left side of the door 550, and the other thereof may guide the right side of the door 550. For example, protrusions extending laterally outward may be formed on the left and right sides of the door 550.

When the door 550 is opened and closed, the protrusions may move along a guide groove 590A formed on the inner side surface of each door guide 590. In one example, the guide groove 590A may include a vertical groove portion and an inclined groove portion connected to the lower end of the vertical groove portion and inclined rearward. Therefore, when the door 550 is opened, the door 550 may move rearward and then ascend in the portions of the guide groove 590A, such that the door 550 does not interfere with the rear cover 530.

The door guide 590 may be supported by the supporter 810. More for example, at least one fastening bracket 591 fastened to the supporter 810 may be formed in each door guide 590. The fastening bracket 591 may be fastened to the supporter 810 at the front side of the supporter 810.

The body housing 510 may include a display mounting hole (or display opening) 511 on which the body display 540 is mounted. The display mounting hole 511 may be formed by opening a part of the front surface of the body housing 510. At least a portion of the front surface of the body display 540 mounted on the display mounting hole 511 may be covered by the front cover 520.

In addition, the body housing 510 may be provided with a detection module mounting hole 512 on which a detection module (or sensors) 850 may be mounted. The detection module mounting hole 512 may be formed by opening a part of the front surface of the body housing 510. In one example, the detection module mounting hole 512 may be disposed above the display mounting hole 511, such as to be positioned between the display mounting hole 511 and the head display module 600.

The detection module 850 may be disposed above the body display 540. The detection module 850 may include a depth camera 851 and an upper cliff sensor 852. The depth camera 851 may be disposed above the upper cliff sensor 852. Since the function of each of the depth camera 851 and the upper cliff sensor 852 has been described above, a redundant description thereof will be omitted.

When the detection module 850 is mounted on the display mounting hole 511, the depth camera 851 may detect the front of the robot 1 through the first cover opening OP4 formed in the front cover 520. In addition, the upper cliff sensor 852 may detect the front lower side of the robot 1 through the second cover opening OP5 formed in the front cover 520.

In addition, the body housing 510 may be provided with an acoustic emission port 513 communicating with the acoustic hole 801 (see FIG. 5). For example, the acoustic emission port 513 may be formed through the top surface of the body housing 510. A pair of acoustic emission ports 513 may be formed on the left and right sides of the neck insertion opening 500A.

A first insertion port 510A may be formed on the top surface of the body housing 510. The first insertion port 510A may form a neck insertion opening 500A together with a second insertion port 520A formed on the top surface of the front cover 520.

The body housing 510 may include at least one inner bracket 519 (see FIG. 12) for fastening the inner surface of the body display unit 500 to the supporter 810. For example, a connector (e.g., a screw or bolt may be inserted through an opening in the inner bracket 519 and fastened to the supporter 810 to couple the inner surface of the body housing 510 to the supporter 810. Therefore, a load applied to the body housing 510 may be dispersed to the supporter 810, and the body housing 510 may be reinforced.

The rotation mechanism 700 may be disposed inside the display units 500 and 600. The rotation mechanism 700 may rotate the head display unit 600 with respect to the body display unit 500. The rotation mechanism 700 may include a rotary motor 710 disposed inside the body display unit 500, and at least one rotational shaft 720 rotated by the rotary motor 710. The rotation mechanism 700 may further include a head fastening portion (or head fastening linkage) 740 fastened to the head display unit 600, and a motor mounter (or motor mount) 750 on which the rotary motor 710 is received.

The rotary motor 710 may be disposed behind the detection module 850 and above the hub unit 570. The rotary motor 710 may be supported by the supporter 810. For example, the rotary motor 710 may be mounted on the motor mounter 750, and the motor mounter 750 may be supported by the supporter 810. More specifically, the motor mounter 750 may be provided with a fastening bracket (not illustrated) fastened to the supporter 810. However, the present disclosure is not limited thereto, and the motor mounter 750 may be directly fastened to the supporter 810. The rotary motor 710 and the motor mounter 750 may be disposed below the neck housing 620.

The rotational shaft 720 may be rotatably connected to the rotary motor 710 to receive a rotational force generated by the rotary motor 710. The rotational shaft 720 may extend upward from the rotary motor 710 and pass through the hollow 620A formed in the inside of the neck housing 620. In this manner, the neck housing 620 may be made thin (e.g., smaller in diameter) as compared with a configuration in which the rotary motor 710 is disposed inside the neck housing 620. In addition, since the rotary motor 710 is not disposed inside the neck housing 620, the wire or harness may easily pass through the inside of the neck housing 620.

The head fastening portion (or linkage) 740 may rotate together with the rotational shaft 720. Since the head fastening portion 740 is fastened to the head display unit 600, the head display unit 600 may rotate together with the head fastening portion 740 and the rotational shaft 720. For example, the head fastening portion 740 may be fastened to the rear side of the head display 640. Embodiments are not limited thereto, and the head fastening portion 740 may be directly fastened to the head housing 610, or may be fastened to a separate bracket (not illustrated) provided in the head housing 610. A more detailed configuration of the rotation mechanism 700 will be described later in detail.

The robot 1 may include a speaker 800 disposed inside the body display unit 500. For example, the speaker 800 may include a speaker unit (e.g., a speaker cone and magnet to drive movement of the speaker code) electrically connected to the audio unit 580 to emit sound, and an enclosure enclosing the speaker unit.

The speaker 800 may be disposed inside the upper inner portion of the body display unit 500. For example, the vertical distance between the speaker 800 and the top surface of the body display unit 500 may be less than the vertical distance between the speaker 800 and the main body 100 (see FIG. 1).

The speaker 800 may be disposed above the supporter 810. For example, the vertical distance from the top surface of the body display unit 500 to the supporter 810 may be greater than the vertical distance from the top surface of the body display unit 500 to the bottom surface of the speaker 800.

The speaker 800 may be positioned to face the acoustic hole 801 (see FIG. 5). For example, the speaker 800 may be disposed to output sound toward or to otherwise face the acoustic hole 801 at the lower side of the acoustic emission port 513. Therefore, the sound of the speaker 800 may be smoothly emitted through the acoustic hole 801.

A pair of speakers 800 spaced apart from each other in left and right may be provided. The pair of speakers 800A and 800B may be referred to as a first speaker 800A and a second speaker 800B, respectively. The speaker 800 may be spaced apart from the rotation mechanism 700, and more specifically, spaced apart from the rotary motor 710 and the motor mounter 750.

In addition, the speaker 800 may be disposed at a higher position in the body display unit 500 than the rotary motor 710. For example, a vertical distance n2 from the top surface of the body display unit 500 to a top surface of the rotary motor 710 may be greater than the vertical distance n1 from the top surface of the body display unit 500 to the bottom surface of the speaker 800. In this configuration, adverse effects related to the rotation and vibration of the rotary motor 710 on the speaker 800 may be minimized. Therefore, it is possible to provide an enhanced acoustic experience for the user.

The speaker 800 may overlap the rotational shaft 720 in a horizontal direction. For example, the rotational shaft 720 may pass between the pair of speakers 800A and 800B. For example, the first speaker 800A and the second speaker 800B may be disposed opposite to each other with respect to the rotational shaft 720. In addition, the speaker 800 may overlap a supporting shaft 770 (see FIG. 13) to be described later in the horizontal direction.

In addition, the speaker 800 may be disposed on the side of the neck housing 620. For example, at least part of the speaker 800 may overlap the neck housing 620 in a horizontal direction. For example, at least a part of the speaker 800 may horizontally overlap a portion of the neck housing 620 inserted into the inside of the body display unit 500 through the neck insertion opening 500A. Therefore, adverse effects of rotation and vibration of the rotational shaft 720 on the speaker 800 may be minimized.

The speaker 800 may be supported by the body housing 510 and may be spaced apart from the supporter 810. For example, a speaker mounting portion (not illustrated) in which the speaker 800 is mounted may be formed on the inner side of the body housing 510. Therefore, the vibration of the rotary motor 710 transmitted to the supporter 810 through the motor mounter 750 may not be transmitted to the speaker 800. Therefore, it is possible to prevent the vibration of the rotary motor 710 and the vibration of the speaker 800 from causing resonance.

The supporter 810 may be vertically elongated inside the body display unit 500. For example, the supporter 810 may be vertically elongated inside the body housing 510. The supporter 810 may correspond to a vertical frame and may include a metal material or other rigid material.

The lower end of the supporter 810 may be coupled to or otherwise supported by the main body 100 (see FIG. 3). For example, the lower end of the supporter 810 may be supported by the top plate 230 of the main body 100. For example, the supporter 810 may extend upward from the main body 100, pass through the lower opening 500B, and be disposed inside the body display unit 500.

A plurality of supporters (or support posts) 810 spaced apart from each other in a horizontal (e.g., left-right) direction may be provided. For example, the pair of supporters 810 may be provided. The pair of supporters 810A and 810B may be referred to as a first supporter 810A and a second supporter 8106, respectively. In other examples, the robot 1 may include more than two supporters 810.

As previously described, the supporter 810 may be coupled to or otherwise support at least one of the interface module 560, the hub unit 570, the audio unit 580, or the door guide 590. The supporter 810 may also be fastened to the motor mounter 750 and support the rotation mechanism 700. In addition, the supporter 810 may support the load of the head display unit 600 connected to the rotation mechanism 700. Therefore, since the loads of various components may be carried by the supporter 810 in the above-described configurations, the loads of these components are not supported by the body housing, 510 and the body housing 510 may be made relatively more thin, light, and compact.

The supporter 810 may be fastened to the body housing 510 by the inner bracket 519 to reinforce the body housing 510. In addition, the loads of the body display 540, the speaker 800, and the detection module 850 supported by the body housing 510 may be dispersed to the supporter 810.

Figure 13:
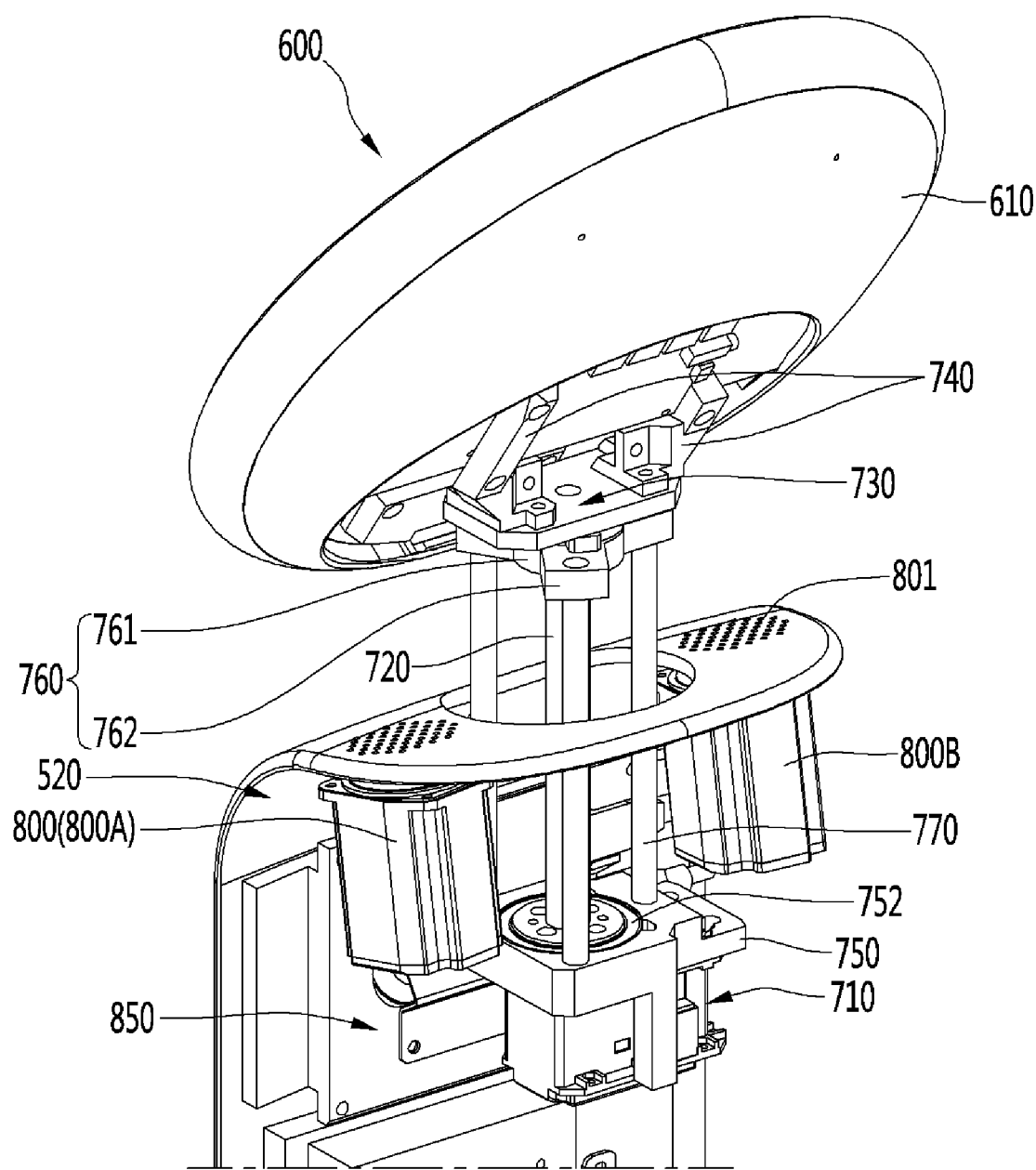
FIG. 13 is a view illustrating a rotation mechanism included in the robot of FIG. 1 according to an embodiment.
Figure 14:
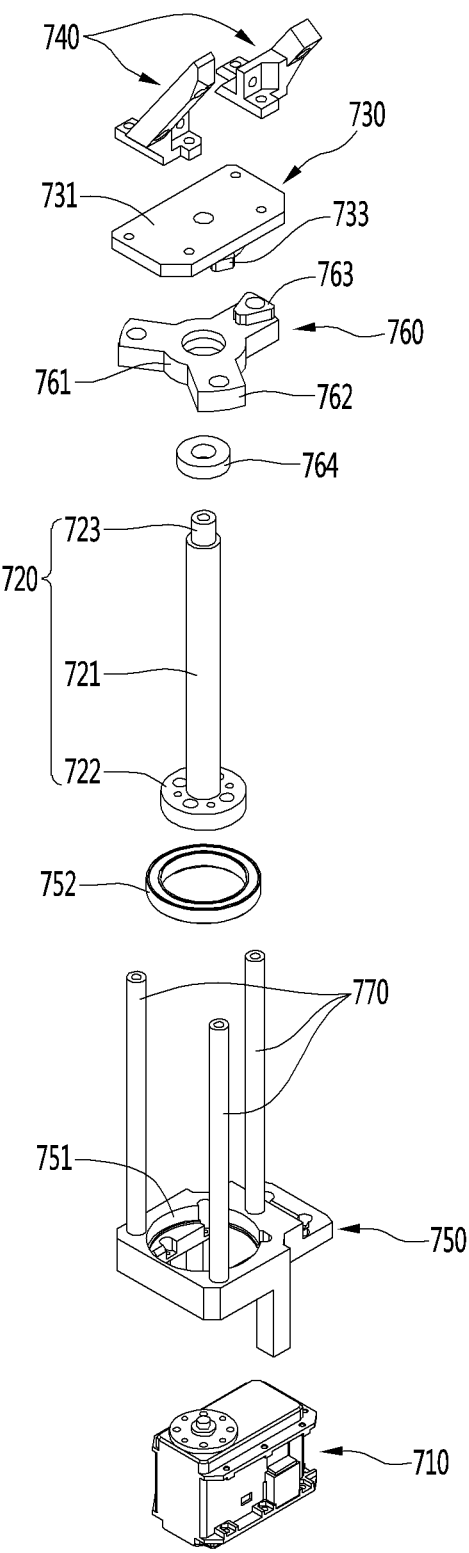
FIG. 14 is an exploded perspective view of the rotation mechanism of FIG. 13 according to an embodiment.
Figure 15:
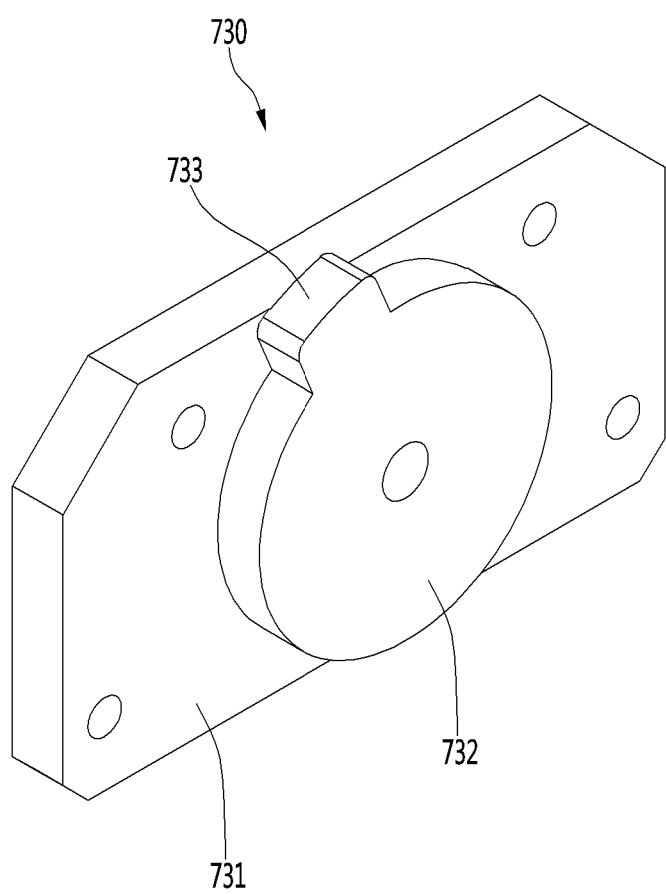
FIG. 15 is a bottom view of a shaft connecting body included in the robot of FIG. 1 according to an embodiment.

FIG. 13 is a view illustrating the rotation mechanism 700 according to an embodiment, FIG. 14 is an exploded perspective view of the rotation mechanism 700 according to an embodiment, and FIG. 15 is a bottom view of a shaft connecting body 730 included the rotation mechanism 700 according to an embodiment. In FIG. 13, the body housing 510, the rear cover 530, and the neck housing 620 are removed to ease understanding of the rotation mechanism 700.

The rotation mechanism 700 may include a rotary motor 710, a rotational shaft 720, a shaft connecting body (or shaft connecting plate) 730, and a head connecting portion (or head connecting linkage) 740. The rotation mechanism 700 may further include a motor mounter (or mount) 750, a shaft supporting portion (or shaft support) 760, and a supporting shaft 770.

As described above, the rotary motor 710 may be disposed inside the body display unit 500. The rotary motor 710 may be disposed behind the detection module 850 and may be disposed at a position lower than the speaker 800. The rotary motor 710 may be spaced apart from the speaker 800. The rotary motor 710 may be mounted on the motor mounter 750.

The rotational shaft 720 may be rotatable by the rotary motor 710. The rotational shaft 720 may be elongated in the vertical direction. The lower end of the rotational shaft 720 may be connected to the rotary motor 710, and the upper end of the rotational shaft 720 may be connected to the shaft connecting body 730.

The upper end and the lower end of the rotational shaft 720 may be rotatably supported by bearings 764 and 752, respectively. Therefore, the rotational shaft 720 may smoothly rotate in a horizontal direction. For example, the rotary shaft 720 may include a shaft 721, a lower connecting portion (or lower connecting end or connection flange) 722 formed at the lower end of the shaft 721, and an upper connecting portion (or upper connecting end) 723 formed at the upper end of the shaft 721.

The shaft 721 may extend in a vertical direction. The lower connecting portion 722 may be connected to the rotary motor 710. The diameter of the lower connecting portion 722 may be larger than the diameter of the shaft 721. A lower bearing 752 may rotatably support the lower connecting portion 722 with respect to the horizontal direction. For example, the lower connecting portion 722 may be inserted within a central opening in the lower bearing 752. The motor mounter 750 may be provided with a lower bearing mounting portion (or lower bearing mounting surface) 751 on which the lower bearing 752 is mounted.

The upper connecting portion 723 may be connected to the shaft connecting body 730. The diameter of the upper connecting portion 723 may be smaller than the diameter of the shaft 721. For example, the lower bearing mounting may be stepped inward in comparison to the shaft 721.

The upper bearing 764 of the shaft supporting portion 760 may rotatably support the upper connecting portion 723 with respect to a horizontal direction. For example, the upper connecting portion 723 may be inserted within a central opening in the upper bearing 764 so that the shaft 721 may rotate relative to the shaft supporting portion 760.

The shaft connecting body 730 may be connected to the upper connecting portion 723 of the rotational shaft 720. The shaft connecting body 730 may include a fitting hole into which the upper connecting portion 723 is inserted. The shaft connecting body 730 may rotate together with the shaft 720. For example, the upper connecting portion 723 and the shaft connecting body 730 may be integrally formed as a single component, may be coupled by a friction force, welding, an adhesive, or by a fastening device, such as a screw or bolt.

The head connecting portion 740 fastened to the head display unit 600 may be coupled to the top surface of the shaft connecting body 730. Therefore, the head fastening portion 740 may rotate together with the rotational shaft 720 and the shaft connecting body 730. A portion of the head connecting portion 740 may extend at an angle from a substantially horizontal top surface of the shaft connecting body 730 to connect to and position the head display 540 at an angle (e.g., direction B2 in FIG. 9).

A locking protrusion 733 may be formed on the shaft connecting body 730. The locking protrusion 733 may be caught by a limiter (or limiting protrusion) 763 on the shaft support 760, which is to be described later, to limit the rotation range of the head display unit 600.

For example, the shaft connecting body 730 may include a panel portion (or plate) 731 and a disk portion (or disk) 732 formed below the panel portion 731 (e.g., the disk portion 732 is positioned further from the head display device 600 and closer to a travel surface than the panel portion 731). The panel portion 731 may have a substantially rectangular plate shape, but is not limited thereto and may have other shapes, such as a planar plate. The head fastening portion 740 may be fastened to a top surface of the panel portion 731.

The disk portion 732 may be formed to be smaller than the panel portion 731. The disk portion 732 may protrude downward from a bottom surface of the panel portion 731 that is opposite to the head fastening portion 740. The disk portion 732 may be fixed to the panel portion 731. For example, the disk portion 732 may be integrally formed with the panel portion 731, but is not limited thereto.

A locking protrusion 733 may be formed on the disk portion 732. For example, the locking protrusion 733 may protrude radially outward from the outer circumference of the disk portion 732.

The shaft supporting portion 760 may rotatably support the rotational shaft 720 with respect to a horizontal direction. The shaft supporting portion 760 may be disposed below the shaft connecting body 730. The shaft supporting portion 760 may be a configured to be fixed and not rotate, as described below.

In addition, the limiter (or limiting protrusion) 763 protruding upward may be formed on the shaft supporting portion 760. The locking protrusion 733 formed on the shaft connecting body 730 may be configured to interfere with the limiter 763 to limit the rotation range. Therefore, the rotation range of the head display unit 600 may be restricted, and the robot 1 provides an appearance similar to that of a human (e.g., the head display unit 600, similar to a human head, does not rotate beyond a prescribed rotational range), such that the user can feel more comfortable with the robot 1.

In one configuration, the shaft supporting portion 760 may include an annular portion (or ring) 761, a plurality of protrusion portions (or arms) 762, and the upper bearing 764. The rotational shaft 720 may pass through the annular portion 761. For example, the rotational shaft 720 may pass through the annular portion 761 and be connected to the shaft connecting body 730.

The upper bearing 764 may be mounted on the inner circumferential surface of annular portion 761. The upper bearing 764 may rotatably support the rotational shaft 720 in contact with the rotational shaft 720 in a state of being mounted on the annular portion 761.

The protrusion portions 762 may protrude radially outwardly from the annular portion 761. A plurality of protrusion portions 762 spaced apart from each other by a predetermined distance in the circumferential direction of the annular portion 761 may be formed. For example, three protrusion portions 762 may be included in the shaft supporting portion 760. For example, the three protrusion portions 762 may be equally space around the annular portion 761 in a circumferential direction (e.g., spaced 120 degrees apart)

The limiter 763 may be formed on an upper surface of one of the plurality of protrusion portions 762. The limiter 763 may protrude upward from the protrusion portion 762. The plurality of protrusion portions 762 may be connected at the lower surface of the shaft supporting portion 760 to the plurality of supporting shafts 770, respectively. Therefore, the shaft supporting portion 760 may be fixed.

Since the shaft supporting portion 760 includes the annular portion 761 and the protrusion portion 762, the size of the annular portion 761 may be kept compact while sufficiently separating the supporting shaft 770 and the rotary shaft 720. Therefore, even when the shaft supporting portion 760 is disposed inside the neck housing 620 (see FIG. 11), the wire or harness may easily pass through the inside of the neck housing 620.

The one or more supporting shafts 770 may extend between the motor mounter 750 and the shaft supporting portion 760 to fix a positioned of the shaft supporting portion 760. The supporting shafts 770 may extend in a vertical direction. For example, the supporting shafts 770 may extend into the body display unit 500 through the inside of the neck support 620 (see FIG. 11) at the shaft supporting portion 760, more particularly, the protrusion portion 762. The lower end of the supporting shaft 770 may be connected to the motor mounter 750.

A plurality of supporting shafts 770 respectively connected to the plurality of protrusion portions 762 may be provided. In one example, the number of the supporting shafts 770 may correspond to the number of the protrusion portions 762 of the shaft supporting portion 760. Therefore, the plurality of supporting shafts 770 may firmly fix a location of the shaft supporting portion 760.

According to embodiments, the rotary motor may be disposed inside the body display unit, and the rotational shaft rotated by the rotary motor may rotate the head display unit. Therefore, there is an advantage that the neck housing of the head display unit may be made thin.

In addition, since the rotary motor is not disposed inside the neck housing, the wire or the harness may easily pass through the inside of the neck housing. In addition, since the speaker is disposed inside the body display unit, not the head display unit, the head display unit may be made thin.

In addition, the speaker may overlap the rotational shaft, not the rotary motor, in the horizontal direction. That is, there may be a difference in installation height between the speaker and the rotary motor. Therefore, it is possible to minimize adverse effects of rotation and vibration of the rotary motor on the speaker. Therefore, it is possible to provide an enhanced acoustic experience for the user.

In addition, the rotary motor may be disposed further below the speaker with respect to the top surface of the body display unit. Therefore, it is possible to minimize noise emitted from the rotary motor through the acoustic holes formed on the top surface of the body display unit. In addition, the rotational shaft may pass between the pair of right and left speakers. Therefore, the body display unit may be made compact in the front-rear direction.

In addition, the head display unit may include the head housing and the neck housing, and the head housing may be formed to be larger than the neck housing. Therefore, the appearance of the robot becomes similar to that of a human, and the user may feel friendly.

In addition, at least part of the speaker may overlap the neck housing in the horizontal direction. Therefore, it is possible to minimize adverse effects of rotation and vibration of the rotational shaft on the speaker. Therefore, it is possible to provide a further enhanced acoustic experience for the user.

In addition, the shaft supporting portion may rotatably support the rotational shaft with respect to the horizontal direction. Therefore, the rotational shaft may be stably rotated. In addition, the plurality of supporting shafts may support the shaft supporting portion, and the lower end of the supporting shaft may be connected to the motor mounter. Therefore, the shaft supporting portion may be firmly fixed.

In addition, the shaft supporting portion may include the plurality of protrusion portions protruding radially outward from the annular portion and respectively connected to the plurality of supporting shafts. Therefore, the size of the shaft supporting portion may be kept compact while sufficiently separating the supporting shaft and the rotational shaft. Therefore, even when the shaft supporting portion is disposed inside the neck housing, the wire or harness may easily pass through the inside of the neck housing.

In addition, at least part of the speaker may overlap the supporting shaft in the horizontal direction. That is, the installation position of the motor mounter supporting the lower end of the supporting shaft may be lower than that of the speaker. Therefore, adverse effects of the vibration transmitted from the rotary motor to the motor mounter on the speaker may be minimized. Therefore, it is possible to provide a further enhanced acoustic experience for the user.

In addition, the limiter is formed on the fixed shaft supporting portion, and the locking protrusion caught by the limiter may be formed on the shaft connecting body rotating together with the rotational shaft. Therefore, the rotation range of the head display unit may be easily limited. Therefore, the operation of the robot becomes similar to that of the human, and the user may feel friendly.

In addition, the acoustic holes formed in the body display unit may face the back side of the head display unit facing the rear lower side. Therefore, the head display unit may prevent water droplets falling from the upper side of the robot from flowing into the acoustic holes.

In addition, the acoustic holes may be formed on the left or right side of the neck insertion opening in the top surface of the body display unit. Therefore, the body display unit may be made compact in the front-rear direction.

In addition, the vertical distance between the speaker and the top surface of the body display unit may be shorter than the vertical distance between the speaker and the main body. That is, the speaker may be disposed closer to the head display unit than the main body. Therefore, sound may be transmitted to the user more easily than the case where the speaker is disposed in the main body.

In addition, the first direction in which the acoustic hole faces and the second direction in which the head display faces may intersect with each other without being parallel to each other. That is, the top surface of the body display unit on which the acoustic hole is formed may not be formed as inclined as the head display. Therefore, it is possible to prevent the neck housing from being formed too long so as to prevent the head display unit and the body display unit from interfering with each other.

Embodiments provide a robot capable of having a rotatable and slender neck. Embodiments may also provide a robot capable of providing enhanced sound to a user.

In one embodiment, a robot may include: a main body provided with a traveling unit; a body display unit disposed on an upper portion of a front side of the main body and elongated in a vertical direction; a head display unit rotatably connected to an upper portion of the body display unit; a rotary motor disposed inside the body display unit; a rotational shaft elongated in a vertical direction and rotated by the rotary motor to rotate the head display unit; and a speaker disposed inside the body display unit, spaced apart from the rotary motor, and overlapping the rotational shaft in a horizontal direction.

A vertical distance from a top surface of the body display unit to the rotary motor may be longer than a vertical distance from the top surface of the body display unit to a bottom surface of the speaker. The speaker may be provided with a pair spaced apart from each other in left and right, and the rotational shaft may pass between the pair of speakers.

The head display unit may include: a neck housing rotatably connected to the body display unit, wherein at least part of the rotational shaft is disposed therein; a head housing fastened to the neck housing and spaced apart from the body display unit; and a head display provided in the head housing. The head housing may be larger than the neck housing.

A neck insertion opening into which the neck housing is inserted may be formed on a top surface of the body display unit, and at least part of the speaker may overlap the neck housing in the horizontal direction.

The robot may further include a shaft supporting portion disposed inside the neck housing and rotatably supporting the rotational shaft with respect to the horizontal direction. The robot may further include a plurality of supporting shafts extending from the shaft supporting portion through the inside of the neck housing into the body display unit. A lower end of the supporting shaft may be connected to a motor mounter on which the rotary motor is mounted.

The shaft supporting portion may include: an annular portion passing through the rotational shaft; and a plurality of protrusion portions protruding radially outward from the annular portion and respectively connected to the plurality of supporting shafts. At least part of the speaker may overlap the supporting shaft in the horizontal direction. The shaft supporting portion may be provided with a limiter that protrudes upward and limits a rotation range of the head display unit.

The head display unit may further include a shaft connecting body disposed above the shaft supporting portion and connected to the rotational shaft, and the shaft connecting body may be provided with a locking protrusion caught by the limiter.

In one embodiment, a robot may include: a main body provided with a traveling unit; a body display unit disposed on an upper portion of a front side of the main body and elongated in a vertical direction; an acoustic hole formed in the body display unit; a speaker disposed inside the body display unit and facing the acoustic hole; and a head display unit rotatably connected to an upper portion of the body display unit and having a back surface facing a rear lower side, wherein the acoustic hole faces a back surface of the head display unit in a vertical direction.

The head display unit may include: a neck housing rotatably connected to the body housing; and a head housing fastened to the neck housing and spaced apart from the body display unit, wherein a neck insertion opening into which the neck housing is inserted is formed on a top surface of the body display unit. The acoustic hole may be formed on a left or right side of the neck insertion opening on the top surface of the body display unit.

In one embodiment, a robot may include: a main body provided with a traveling unit; a body display unit disposed on an upper portion of a front side of the main body and elongated in a vertical direction; a speaker disposed inside the body display unit; and a head display unit rotatably connected to an upper portion of the body display unit, wherein a vertical distance between the speaker and a top surface of the body display unit is shorter than a vertical distance between the speaker and the body.

The robot may further include: a rotary motor disposed inside the body display unit; and a rotational shaft elongated in a vertical direction, connected to the head display unit, and rotated by the rotary motor, wherein a vertical distance between the rotary motor and the top surface of the body display unit is longer than a vertical distance between the speaker and the top surface of the body display unit.

In one embodiment, a robot may include: a main body provided with a traveling unit; a body display unit disposed on an upper portion of a front side of the main body and elongated in a vertical direction; an acoustic hole formed in the body display unit and facing a first direction; a speaker disposed inside the body display unit and facing the acoustic hole; a head housing rotatably connected to an upper portion of the body display unit; and a head display disposed in the head housing and facing a second direction intersecting with the first direction. A height of the body display unit may be higher than a height of the main body.

In one embodiment, a robot may comprise: a lower housing; one or more wheels that extend below the lower housing and rotate to move the robot; an upper housing that extends vertically upward from the lower housing; a head display positioned above the upper housing; a motor provided in the upper housing; a rotational shaft that extends in a vertical direction above the upper housing and is coupled to the head display, the rotational shaft being rotated based on a rotational force from the motor to rotate the head display; and a speaker provided in the upper housing, the speaker being spaced apart from the motor and overlapping at least a portion of the rotational shaft in a horizontal direction.

A vertical distance between a top surface of the upper housing and the motor is greater than a vertical distance between the top surface of the upper housing and a bottom surface of the speaker.

The speaker may be a first speaker, and the robot may further comprise a second speaker that is spaced apart from the first speaker in a horizontal direction. A portion of the rotational shaft may be provided between the first speaker and the second speaker.

The may further comprise a neck housing rotatably connected to the upper housing, wherein at least part of the rotational shaft is provided therein; and a head housing fastened to the neck housing and spaced apart from the upper housing. The head display may be received in the head housing. The head housing may be larger than the neck housing in a horizontal direction.

An opening, through which the neck housing is inserted, may be formed on a top surface of the upper housing, at least a part of the speaker may overlap the neck housing in the horizontal direction.

The robot may further comprise a shaft support provided inside the neck housing and configured to rotatably support the rotational shaft with respect to a horizontal plane.

The robot may further comprise a plurality of supporting shafts extending from the shaft support through an inside of the neck housing and into the upper housing. A lower end of each of the supporting shafts may be connected to a motor mount coupled to the motor.

The shaft support may include: an annular ring through which the rotational shaft passes; and a plurality of protrusions protruding radially outward from the annular ring respectively connected to the plurality of supporting shafts to fix the shaft support.

At least a part of the speaker may overlap the supporting shafts in a horizontal direction. The shaft support may include a protrusion that extends upward from an upper surface of the shaft support to limit a rotation range of the head display.

The robot may further comprise a shaft connecting plate provided above the shaft support and connected to the rotational shaft. The shaft connecting body may include a locking protrusion configured to selectively interfere with the limiting protrusion of the shaft support based on the rotation of the rotational shaft to limit the rotation range of the head display.

The head display may be a first display, and the robot may further comprise a second display provided in the upper housing, the second display outputting content in a horizontal direction.

In one embodiment, a robot may comprise: a lower housing; one or more wheels that extend below the lower housing and rotate to move the robot; an upper housing having a lower end coupled to the lower housing; an acoustic hole formed in the upper housing; a speaker positioned in the upper housing and to output sound via the acoustic hole; and a head display module rotatably connected to an upper end of the upper housing, the head display module including a head display and a head display housing having a first surface to receive the head display and a second surface that is angled to face a rearward and downward direction. The acoustic hole may be provided on the upper housing to face the back surface of the head display housing in a vertical direction.

The head display module may further include: a neck housing rotatably connected to the upper housing. The head housing may be fastened to the neck housing and spaced apart from the upper housing. A neck insertion opening into which a portion of the neck housing is inserted may be formed on an upper surface of the upper housing.

The head housing may position the head display to output visual content in an upward and forward direction. The acoustic hole may be formed on a left or right side of the neck insertion opening on the top surface of the upper housing.

In one embodiment, a robot may comprise a lower housing; one or more wheels that extend below the lower housing and rotate to move the robot; an upper housing provided to extend vertically upward from the lower housing; a first display provided at a front surface of the upper housing; a speaker provided in the upper housing; and a second display rotatably connected to an upper end of the upper housing. A vertical distance between an upper end the speaker and an upper end of the upper housing may be less than a vertical distance between a lower end of the speaker and the lower housing.

The robot may comprise a motor provided in the upper housing; and a rotational shaft extending in a vertical direction, the rotational shaft connected at a one end to the second display, and configured to rotate the second display based on a rotational force received from by the motor. A vertical distance between the motor and the upper end of the upper housing may be greater than a vertical distance between the lower end of the speaker and the upper end of the upper housing.

In another embodiment, a robot may comprise: a lower housing; one or more wheels that rotate to move the robot; an upper housing that extends vertically and is coupled at a lower end to the lower housing; an acoustic hole formed in an upper end of the upper housing and positioned to face a first direction; a speaker positioned in the upper housing and to output audio content via the acoustic hole; a head housing rotatably connected to the upper end of the upper housing; and a head display received in the head housing and positioned to face a second direction that intersects the first direction.

The robot may further comprise a body display coupled to the upper housing and positioned to output visual content in a forward horizontal direction, and wherein the second direction is a forward upward direction.

The scope of protection of the present disclosure should be interpreted by the appending claims, and all technical ideas within the scope of equivalents should be construed as falling within the scope of the present disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot comprising:
a lower housing;
one or more wheels that extend below the lower housing and rotate to move the robot;
an upper housing that extends vertically upward from the lower housing;
a head display positioned above the upper housing;
a motor provided in the upper housing;
a rotational shaft that extends in a vertical direction above the upper housing and is coupled to the head display, the rotational shaft being rotated based on a rotational force from the motor to rotate the head display; and
a speaker provided in the upper housing, the speaker being spaced apart from the motor and overlapping at least a portion of the rotational shaft in a horizontal direction,
wherein the robot further comprises:
a neck housing rotatably connected to the upper housing, wherein at least part of the rotational shaft is provided therein; and
a head housing fastened to the neck housing and spaced apart from the upper housing,
wherein the head display is received in the head housing,
wherein the rotational shaft passes through an inside of the neck housing,
wherein an opening, through which at least part of the neck housing is inserted, is formed on a top surface of the upper housing, and
wherein at least a part of the speaker overlaps the neck housing in the horizontal direction.

2. The robot according to claim 1, wherein a vertical distance between a top surface of the upper housing and the motor is greater than a vertical distance between the top surface of the upper housing and a bottom surface of the speaker.

3. The robot according to claim 1, wherein:
the speaker is a first speaker,
the robot further comprises a second speaker that is spaced apart from the first speaker in a horizontal direction, and
a portion of the rotational shaft is provided between the first speaker and the second speaker.

4. The robot according to claim 1, wherein the head housing is larger than the neck housing in a horizontal direction.

5. The robot according to claim 1, further comprising a shaft support provided inside the neck housing and configured to rotatably support the rotational shaft with respect to a horizontal plane.

6. The robot according to claim 5, further comprising a plurality of supporting shafts extending from the shaft support through the inside of the neck housing and into the upper housing,
wherein a lower end of each of the supporting shafts is connected to a motor mount coupled to the motor.

7. The robot according to claim 6, wherein the shaft support includes:
an annular ring through which the rotational shaft passes; and
a plurality of protrusions protruding radially outward from the annular ring and respectively connected to the plurality of supporting shafts to fix the shaft support.

8. The robot according to claim 6, wherein at least a part of the speaker overlaps the supporting shafts in a horizontal direction.

9. The robot according to claim 5, wherein the shaft support includes a protrusion that extends upward from an upper surface of the shaft support to limit a rotation range of the head display.

10. The robot according to claim 9, wherein further comprising:
a shaft connecting plate provided above the shaft support and connected to the rotational shaft,
the shaft connecting plate including a locking protrusion configured to selectively interfere with the protrusion of the shaft support based on the rotation of the rotational shaft to limit the rotation range of the head display.

11. The robot according to claim 1, wherein the head display is a first display, and
wherein the robot further comprises a second display provided in the upper housing, the second display outputting content in a horizontal direction.

* * * * *